US008590933B2

United States Patent
Narita et al.

(10) Patent No.: US 8,590,933 B2
(45) Date of Patent: Nov. 26, 2013

(54) IMPACT ABSORBING STEERING APPARATUS

(75) Inventors: Noritomo Narita, Gunma (JP); Kou Yamamoto, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/202,461

(22) PCT Filed: Jul. 25, 2011

(86) PCT No.: PCT/JP2011/066883
§ 371 (c)(1),
(2), (4) Date: Dec. 21, 2011

(87) PCT Pub. No.: WO2012/017854
PCT Pub. Date: Feb. 9, 2012

(65) Prior Publication Data
US 2012/0080874 A1 Apr. 5, 2012

(30) Foreign Application Priority Data

Aug. 6, 2010 (JP) .................................. 2010-176970
Aug. 19, 2010 (JP) .................................. 2010-183753

(51) Int. Cl.
*B62D 1/19* (2006.01)
(52) U.S. Cl.
USPC ........................................................ 280/777
(58) Field of Classification Search
CPC ........................................................ B62D 1/19
USPC ................................................ 280/777, 775
See application file for complete search history.

(56) References Cited

U.S. PATENT DOCUMENTS 5,378,021 A 1/1995 Yamaguchi et al.
5,640,884 A * 6/1997 Fujiu et al. ....................... 74/492

(Continued)

FOREIGN PATENT DOCUMENTS

DE 10 2008034807 10/2009
EP 1992544 11/2008

(Continued)

OTHER PUBLICATIONS

JP 2010-155485 English translation.*

(Continued)

*Primary Examiner* — Karen Beck
(74) *Attorney, Agent, or Firm* — Katten Muchin Rosenman LLP

(57) ABSTRACT

Construction of an impact absorbing steering wheel apparatus that is capable of obtaining excellent performance at low cost while maintaining the freedom of design is achieved. An energy absorbing member comprises: a base plate section 55, 71; an energy absorbing section 53, 73 that is located in the rear half section of the base plate section, or extends toward the rear from the base plate section and has a bent back section 57, 73 that is bent back in a U shape upward or downward with respect to the base plate section; a rear end installation section 58, 74 that is located on the tip end section of the bent back section; and a front end installation section 54, 76 that is located in front of the base plate section; wherein the tip end section of the bent back section 57, 73 and the rear end installation section 58, 74 are located in a space between a pair of held wall sections 11a and fastened to a tightening rod 27a; the front end installation section 54, 76 is fastened to the front end section of an inner column 14a or the housing 16 of a electric-powered steering apparatus. Near the energy absorbing section 53, 73, there is a guide section that, when the bent back section 57, 73 moves as the rear end installation section 58, 74 moves in the forward direction together with an outer column 13a during a secondary collision, guides the movement of the bent back section 57, 73.

17 Claims, 26 Drawing Sheets

(56) References Cited

U.S. PATENT DOCUMENTS

| | | | |
|---|---|---|---|
| 7,188,867 B2* | 3/2007 | Gatti et al. | 280/777 |
| 2004/0245759 A1* | 12/2004 | Yamada et al. | 280/775 |
| 2005/0087970 A1* | 4/2005 | Ulintz | 280/775 |
| 2005/0225903 A1* | 10/2005 | Sprankle et al. | 360/264.3 |
| 2006/0028010 A1* | 2/2006 | Yamada | 280/775 |
| 2006/0181069 A1* | 8/2006 | Yamada | 280/775 |
| 2007/0039403 A1* | 2/2007 | Manwaring et al. | 74/492 |
| 2007/0228716 A1* | 10/2007 | Menjak et al. | 280/777 |
| 2007/0273137 A1* | 11/2007 | Yamada et al. | 280/775 |
| 2008/0174096 A1* | 7/2008 | Oh | 280/777 |
| 2008/0252056 A1* | 10/2008 | Moriyama et al. | 280/775 |
| 2011/0175335 A1* | 7/2011 | Takezawa et al. | 280/775 |
| 2011/0204610 A1* | 8/2011 | Kwon | 280/775 |
| 2012/0080873 A1* | 4/2012 | Narita et al. | 280/777 |
| 2012/0080874 A1* | 4/2012 | Narita et al. | 280/777 |
| 2012/0187669 A1* | 7/2012 | Minamigata et al. | 280/777 |
| 2012/0193901 A1* | 8/2012 | Jouta et al. | 280/775 |
| 2012/0193902 A1* | 8/2012 | Akutsu et al. | 280/777 |
| 2012/0267884 A1* | 10/2012 | Fujiwara et al. | 280/777 |

FOREIGN PATENT DOCUMENTS

| | | |
|---|---|---|
| JP | 63-46972 | 2/1988 |
| JP | 2-132576 | 11/1990 |
| JP | 5-75057 | 10/1993 |
| JP | 8-295251 | 11/1996 |
| JP | 10-315986 | 12/1998 |
| JP | 2000-6820 | 1/2000 |
| JP | 2000-95116 | 4/2000 |
| JP | 2001-80527 | 3/2001 |
| JP | 2004-299489 | 10/2004 |
| JP | 2006-312360 | 11/2006 |
| JP | 2008-13110 | 1/2008 |
| JP | 2008-18820 | 1/2008 |
| JP | 2010-155485 | 7/2010 |

OTHER PUBLICATIONS

International Search Report and International Preliminary Examination Report on Patentability dated Nov. 1, 2011, from corresponding International Application No. PCT/JP2011/066883.

Supplemental European Search Report dated Jul. 3, 2013, from Corresponding European Patent Application No. 11743174.2.

* cited by examiner (A)

(B)

(A)

(B)

(A)

(B)

(A)

(B)

(A)

(B)

(A)

(B)

IMPACT ABSORBING STEERING APPARATUS

TECHNICAL FIELD

The present invention relates to the improvement of an impact absorbing steering apparatus that is capable of absorbing impact energy that is applied to a steering wheel from the body of a driver during a collision accident, while the steering wheel displaces in the forward direction.

BACKGROUND ART

As illustrated in FIG. 20, the steering apparatus of an automobile is constructed such that it applies a steering angle to the front wheels by transmitting the rotation of a steering wheel 1 to an input shaft 3 of a steering gear unit 2, and pushing or pulling a pair of left and right tie rods 4 as the input shaft 3 rotates. The steering wheel 1 is supported by and fastened to the rear end section of a steering shaft 5, and with the steering shaft 5 passed in the axial direction through a cylindrical shaped steering column 6, the steering shaft 5 is supported such that it can rotate freely. The front end section of the steering shaft 5 is connected to the rear end section of an intermediate shaft 8 via a universal joint 7, and the front end section of the intermediate shaft 8 is connected to the input shaft 3 via a separate universal joint 9.

During a collision accident, after a primary collision of an automobile with another automobile, a secondary collision occurs in which the body of the driver hits the steering wheel. Therefore, in order to protect the driver, it is necessary for this kind of steering apparatus for an automobile to have construction such that impact energy will be absorbed during a collision accident while the steering wheel displaces in the forward direction. As this kind of construction, patent literature 1 to 5 disclose construction in which the steering column that supports the steering wheel is supported with respect to the vehicle body such that it is capable of collapsing forward due to an impact load in the forward direction during a secondary collision, and an energy absorbing member that absorbs the impact load by plastically deforming is provided between the vehicle body and a member that displaces forward together with this steering column, with such construction already being widely used.

FIGS. 21 to 24 illustrate an example of the construction of an automobile steering apparatus that comprises this kind of impact absorbing function. This construction comprises a tilting mechanism for adjusting the vertical position of the steering wheel 1 (FIG. 20), and a telescoping mechanism for adjusting the forward/backward position thereof, and further comprises a steering column 6a, a support bracket 10, a pair of left and right held wall sections 11 that are provided on the steering column 6a side, and a bracket 12 on the vehicle body side. Of these, the steering column 6a is constructed such that the entire length can extend or contract by fitting together the front section of an outer column 13 on the rear side with the rear section of a inner column 14 on the front side such that they can displace relative to each other in the axial direction. A steering shaft 5a is supported on the inner-diameter side of this kind of steering column 6a such that it can rotate freely. This steering shaft 5a is also constructed such that it can extend or contract along the entire length by combining together an outer shaft and an inner shaft.

A housing 16 for installing component parts of an electric-powered steering apparatus such as an electric motor 15 (FIG. 20) and reduction gear is connected and fastened to the front end section of the steering column 6a. This housing 16 is supported by part of the vehicle body by a bolt (not illustrated in the figure) that is inserted through a support pipe 17 that is provided in the width direction at the top of the housing such that the housing can pivot. The steering wheel 1 is fastened to the rear end section of the steering shaft 5a in the portion that extends further to the rear than the steering column 6a. Moreover, the portion of the front end section of the steering shaft 5a that protrudes further forward than the steering column 6a is connected to an intermediate shaft 8 (FIG. 20) by way of a universal joint 7. Here, the width direction is the width direction of the vehicle when the steering apparatus is assembled in the vehicle.

The support bracket 10 is connected to and supported by the bracket 12 on the vehicle body side, such that it can displace in the forward direction and break away when being subjected to the impact load due to a secondary collision. The support bracket 10 is made of a metal plate such as steel plate having sufficient strength and rigidity, and is formed by connecting and fastening together a top plate 18 and a pair of side plates 19a, 19b by welding or the like. Of these, both end sections in the width direction of the top plate 18 function as connection plate sections 20 for supporting and connecting the support bracket 10 to the bracket 12 on the vehicle side. As illustrated in FIG. 24, cut out sections 21 that open up the edge on the rear end of the connection plate sections 20 are formed in the center section in the width direction of these connection plate sections 20, and capsules 22 are mounted in each of these cut out sections 21.

These capsules 22 axe made of a material that slides easily over the metal plate of the top plate 18 such as synthetic resin or a light alloy including an aluminum alloy. In the normal state, these capsules 22 do not come out from the cut out sections 21, however, when a large impact load is applied in the forward direction to the support bracket 10, members that lock the support bracket 10 inside the cut out sections 21, for example, support pins that span between the top plate 18 and these capsules 22 shear off and the capsules come out of the cut out sections 21 toward the rear. Through holes 23 through which bolts or studs are passed for supporting and connecting the support bracket 10 to the bracket 12 on the vehicle side are provided in the center section of each of these capsules 22. In order to support and connect the support bracket 10 to the bracket 12 on the vehicle side, a bolt is inserted from bottom to top through the through holes 23 of the capsules 22 and screwed into a nut 24 that is supported by and fastened to the bracket 12 on the vehicle side by welding or the like, and tightened. This bracket 12 on the vehicle side is fastened to the vehicle side beforehand, so by tightening the bolt, the support bracket 10 is fastened to and supported by the vehicle body such that it can collapse forward only when a large impact load is applied in the forward direction. The support bracket 10 can also be connected to and supported by the bracket 12 on the vehicle side by inserting a stud that is fastened to the bottom surface of the bracket 12 on the vehicle side from top to bottom through the through hole 23 in the capsule 22 and screwing the bottom end section of this stud to a nut and tightening.

In a pair of holding plate sections 25a, 25b of the side plates 19a, 19b which sandwich the outer column 13 from the both side, long holes 26 are formed at portions that are aligned with each other. These long holes 26 in the vertical direction are formed into a partial circular arc shape around the center axis of the support pipe 17 as the center. The outer column 13 is supported between the side plates 19a, 19b by a tightening rod 27 that is inserted through these long vertical holes 26. In order for this, held wall sections 11 are formed on the upper part of the front section of the outer column 13, and long holes 28 in the forward/backward direction are formed in these held wall sections in the axial direction of the outer column 13 (FIG. 4 and FIG. 6). The outer column 13 is supported by the support bracket 10 by way of the tightening rod 27 that is inserted through the long holes 26 in the vertical direction and the long holes 28 in the forward/backward direction. Therefore, the outer column 13 can pivot in the up or down direction around a bolt that is inserted through the support pipe 17 within the range that the tightening rod 27 can be displaced inside the vertical long holes 26. The outer column 13 can also displace forward and backward (axial direction) within the range that the tightening rod 27 can be displaced inside the long holes 28 in the forward/backward direction.

An outward facing flange shaped rim section 29 is fastened to one end section (right end section in FIG. 22) of the tightening rod 27, and a cam unit 32 having a drive cam 30 and a driven cam 31 is provided on the other end section. By using an adjustment lever 33 to rotate and drive the drive cam 30, it is possible to increase or decrease the distance between the driven cam 31 and the rim section 29. By rotating the adjustment lever 33 in the downward direction when adjusting the position of the steering wheel 1, the distance between the driven cam 31 and the rim section 29 is increased, and in this state, the outer column 13 is displaced within the range that the tightening rod 27 can be displaced inside the long holes 26 in the vertical direction and inside the long holes 28 in the forward/backward direction. This adjusts the position of the steering wheel 1, which is supported by and fastened to the rear end section of the steering wheel shaft 5a that is supported inside this outer column 13 such that it rotates freely. The weight of the portion that raises and lowers together with the outer column 13 is supported by an equalizer spring 35 that is provided between the tightening rod 27 and a locking section 34 that is provided in the support bracket 10. Therefore, it is not necessary for the driver to carry the entire weight of these when adjusting the position of the steering wheel 1.

After the position of the steering wheel 1 has been adjusted, by rotating the adjustment lever 33 upward, the distance between the driven cam 31 and the rim section 29 is decreased. As a result, the inside surfaces of the holding plate sections 25a, 25b strongly come in contact against the outside surfaces of the held wall sections 11, and due to the frictional engagement between these surfaces, the steering wheel 1 is fastened in a vertical position. Moreover, the outer diameter of the front end section of the outer column 13 where the held wall sections 11 are located is decreased, the inner circumferential surface of the front end section of the outer column 13 comes in strong contact with the outer circumferential surface of the rear end section of the inner column 14, and due to the frictional engagement between these surfaces, the steering column 6a is unable to extend or contract. As a result, the front and rear positions of the steering wheel 1 are fastened.

In an automobile steering apparatus having this kind of construction, when a secondary collision occurs after a collision accident, the capsules 22 remain as they are on the side of the bracket 12 on the vehicle body side, while the support bracket 10 displaces in the forward direction. In other words, a large impact load in the forward direction that occurs due to a secondary collision is applied to this support bracket 10 from the steering wheel 1 via the steering shaft 5a, outer column 13 and tightening rod 27. The members that lock the capsules in the connection plate sections 20 shear off, and as these capsules 22 come out from the cut out sections 21, the support bracket 10 displaces in the forward direction. As a result, the steering wheel 1 also displaces in the forward direction, which makes it possible to lessen the impact that is applied to the body of the driver that hits against this steering wheel 1.

When the steering wheel 1 displaces in the forward direction in this way due to a secondary collision, preferably, from the aspect of protecting the driver, the impact energy that is applied to the steering wheel 1 from the body of the driver is absorbed, and the steering wheel is caused to displace in the forward direction. For example, in the construction illustrated in FIG. 21 to FIG. 24, friction force that acts on the contact area between the outside surfaces of the held wall sections 11 and the inside surfaces of the holding plate sections 25a, 25b, and the friction force that acts on the contact area between the inner circumferential surface of the front section of the outer column 13 and the outer circumferential surface of the rear section of the inner column 14 become resistance to the displacement of the steering wheel 1 in the forward direction, and contributes to absorbing the impact energy. However, the ability for the friction force to absorb energy is unstable, and so that alone makes it difficult to completely protect the driver.

In regards to this, patent literature 2 discloses construction in which an energy absorbing member is provided between the vehicle body and the steering column that displaces in the forward direction during a secondary collision. In this construction, as illustrated in FIG. 25 and FIG. 26, an energy absorbing member 36, which is formed by bending a plastically deformable wire rod, is located between a support pin 38 that is fixed to the upper surface of the steering column 6b and a support casing 39 that is fastened to the vehicle body. When the steering column 6b displaces in the forward direction due to a secondary collision, the energy absorbing member 36 elongates from the state illustrated in FIG. 26A to the state illustrated in FIG. 26B. The energy required for this elongation is absorbed from the impact energy that is applied to the steering wheel from the driver's body, which lessens the impact that is applied to the driver's body.

An impact absorbing structure that uses this kind of energy absorbing member 36 can be assembled in the impact absorbing steering apparatus illustrated in FIG. 21 to FIG. 24, making it possible to improve the energy absorption capability, however, in order to obtain better performance at low cost while maintaining the freedom of design, improvements are desired according to the points below.

First, it is desired that the moment in the pivot direction that is applied to the outer column 13 of the steering column 6a during a secondary collision be reduced or eliminated. In other words, when the construction illustrated in FIG. 25 and FIG. 26 is incorporated in a steering apparatus, regardless of whether or not there is a steering wheel position adjustment device such as a tilt mechanism or telescoping mechanism, the installation position of the energy absorbing member 36 and the tightening rod 27 (FIG. 22) may be at right angles with respect to the center axis of the outer column 13. When there is this kind of offset, a moment in the pivot direction occurs during a secondary collision. In other words, the energy absorbing member 36 functions as a resistance to displacement in the forward direction of the outer column 13 during a secondary collision. As a result, a moment is applied to the steering column 13 with the tightening rod 27 as the pivot point and the energy absorbing member 36 as the input. Therefore, as the secondary collision proceeds, the friction state in the engagement between the outer circumferential surface of the front section of the outer column 13 and the inner circumferential surface of the rear section of the inner column 14 becomes unstable, and thus the energy absorption performance in this engagement section becomes unstable.

This kind of instability in the energy absorption performance can be reduced or eliminated by placing both the energy absorbing member 36 and tightening rod 27 on the same side in the vertical direction of the steering column 6a, 6b, and by reducing the offset in the orthogonal direction with respect to the center axis of the steering column 6a, 6b that exists between these members 36, 27. However, the tightening rod 27 is often located on the lower side of the steering column 6a, 6b. In this case, as illustrated in FIG. 25 and FIG. 26, construction is such that the energy absorbing member 36 is located between the steering column 6b and the vehicle body 37 located on the upper side of this steering column 6b, so it is not possible to reduce the momentum, and thus it is not possible to prevent the energy absorption performance from becoming unstable. In other words, in the construction illustrated in FIG. 25 and FIG. 26, when there is an intention to keep the moment small and prevent the energy absorption performance from becoming unstable, construction in which the tightening rod 27 is located on the lower side of the steering column cannot be employed, and freedom of design is limited. Moreover, in the construction illustrated in FIG. 25 and FIG. 26, the support pin 38 and support casing 39 become necessary as special part for installing the energy absorbing member 36, so an increase in cost in unavoidable.

RELATED LITERATURE

Patent Literature

[Patent Literature 1] Japanese Patent Application Publication No. 2000-095116
[Patent Literature 2] Japanese Patent Application Publication No. S63-046972
[Patent Literature 3] Japanese Patent Application Publication No. 2001-080527
[Patent Literature 4] Japanese Patent Application Publication No. 2006-312360
[Patent Literature 5] Japanese Patent Application Publication No. 112-132576

SUMMARY OF THE INVENTION

Problem to be Solved by the Invention

In consideration of the situation described above, the object of the present invention is to provide construction of an impact absorbing steering apparatus that is capable of excellent performance at low cost while maintaining freedom of design.

Means for Solving the Problems

The impact absorbing steering apparatus of the present invention comprises:
a steering column that comprises: an inner column that is located on the front side in a state in which the forward and backward position is regulated; and an outer column that fits around the rear section of the inner column such that relative displacement is possible in the axial direction, and that has a slit in the axial direction that is provided in the axial direction in the front section that fits with the inner column and enables the diameter of the front section to expand or constrict, a pair of held wall sections that are provided on the top surface or the bottom surface of the front section on both the left and right sides of the axial slit, and a pair of first through holes that are formed in these held wall sections at positions that are aligned with each other;

a steering shaft supported on the inner diameter side of the steering column that comprises; an inner shaft; and an outer shaft that fits around the rear section of the inner shaft such that relative displacement in the axial direction is possible, and the rear end section of the outer shaft protruding further toward the rear than an opening on the rear end of the outer column, a steering wheel being supported by and fastened to that rear end section;

a support bracket that comprises; a pair of left and right holding plate sections; a pair of second through holes that formed in these holding plate sections in positions that are aligned with at least part of the first through holes; and an installation plate section that is supported by the vehicle body and that together with supporting the holding plate sections, is capable of dropping toward the front due to impact energy that is applied from the steering wheel to the outer column during a secondary collision;

a tightening rod that is inserted through the first through holes and second through holes, and that comprises a pair of pressure sections on both end sections;

a fastening unit that increases or decreases the space between the pair of pressure sections, and when that space is decreased, decreases the diameter of the front section of the outer column and creates a friction fit between the inner circumferential surface of the front section of the outer column and the outer circumferential surface of the rear section of the inner column; and and energy absorbing member that is located between a portion that displaces in the forward direction together with the outer column during the secondary collision and a portion that does not displace in the forward direction during that secondary collision, the energy absorbing member being made of a member that plastically deforms as the outer column displaces in the forward direction during the secondary collision, and absorbs part of the impact energy through the relative movement during the plastic deformation.

Particularly, in the impact absorbing steering apparatus of the present invention, the energy absorbing member comprises: a base plate section; an energy absorbing section that is located in the rear half section of the base plate section, or extends to the rear side from the base plate section, and has a U-shaped bent back section which bends back upward or downward with respect to the base plate section; a rear end installation section that is provided on the tip end section of the bent back section; and a front installation section that is provided in front of the base plate section.

Moreover, the tip end section of the bent back section and the rear end installation section are located in a space between the pair of held wall sections, and fastened to a portion that displaces in the forward direction together with the outer column during a secondary collision, and the front end installation section is fastened to a portion that does not displace in the forward direction during a secondary collision.

Preferably, near the energy absorbing section there is a guide section that, when the bent back section moves as the rear end installation section moves in the forward direction together with outer column during the secondary collision, guides the movement of the bent back section.

Preferably, the portion to which the rear end installation section is fastened and that displaces in the forward direction together with the outer column is the tightening rod.

Moreover, preferably, the portion to which the front end installation section is fastened and that does not displace in the forward direction is the front end section of the inner column or a member that is fastened to the front end section of the inner column.

In this case, the portion to which the front end installation section is fastened and that does not displace in the forward direction is a housing that is fastened to the front end section of the inner column and that stores component parts of an electric-powered steering apparatus; the front end installation section comprises contact plate sections that are bent at right angles in directions opposite of each other from the front end edge of the base section or a portion that protrudes in the forward direction from the front end edge of the base section; and with these contact plate sections in contact with the rear end surface of the housing, the front end installation section can be connected and fastened to the housing.

Alternatively, the portion to which the front end installation section is fastened and that does not displace in the forward direction is the front end section of the inner column; the front end installation section comprises members that extend in the same direction upward or downward from the edges on both the left and right sides of the front end section of the base section, or from the portion that protrudes in the forward direction from the front end section of the base section, with each of these members comprising a curved section that curves along the shape of the outer circumferential surface of the inner column, and a tip end section in which an installation hole is formed; and with the curved section fitted around the front end section of the inner column, by inserting a bolt through the installation holes, then screwing the bolt into a nut and tightening the bolt, these tip end sections can be connected and fastened.

As more detailed construction of the energy absorbing member is a form wherein the energy absorbing section extends toward the rear from the base plate section and has the bent back section in the middle section thereof; and the rear end installation section comprises a pair of protruding sections that are provided on the tip end section of the bent back section, and third though holes that are formed in these protruding sections, with the tightening rod being inserted through the third through holes.

In this form, preferably, the impact absorbing steering apparatus further comprises a guide plate having a crank shaped cross section, the guide plate comprising: an installation plate section; a hanging down plate section that is bent at a right angle from the installation plate section, and a guide plate section that is bent at a right angle from the hanging down plate section toward the opposite side from the installation plate section, wherein the installation plate is fastened in a state of contact with the bottom surface of one of the held wall sections; the guide plate section faces a space between the pair of held wall sections and forms a guide space between the guide plate section and the top surface or bottom surface of the front section of the outer column.

With this construction, the energy absorbing section of the energy absorbing member is located in the guide space, and when the bent back section of the energy absorbing section moves as the rear end installation section moves in the forward direction together with the outer column during a secondary collision, the guide plate can guide the movement of the bent back section.

In another form of the impact absorbing steering apparatus of the present invention, the bent back section extends to the rear from the middle section in the width direction of the rear end edge of the base plate section; the base plate section comprises a pair of left and right thin sections that extend from the portion of the rear end edge of the base plate section that is between both the left and right sides of the base end section of the bent back section to the middle section of the base plate section; and the portion of the base plate section that is between the pair of left and right thin section forms part of the energy absorbing section.

Moreover, preferably, the energy absorbing member further comprises a pair of bent plate sections that are bent in the same direction from both the left and right side edges of the base plate section, wherein at least the portions near the rear of top end edges or bottom end edges of the bent plate sections come in contact with or close to the bottom surface or top surface of the held wall sections.

The apparatus of the present invention, preferably comprises telescopic construction wherein the first through holes are constructed as long holes in the forward/backward direction that are long in the axial direction of the outer column, the forward/backward position of the outer column can be adjusted within the range that the tightening rod can displace inside these first through holes, and by operating an adjustment lever that is located at the base end section of the tightening rod, the space between the pair of pressure sections is expanded or contracted, such that when the space is contracted, the diameter of the front section of the outer column is decreased, and the forward/backward position of the outer column is fastened.

Moreover, the apparatus of the present invention preferably comprises tilting construction wherein the front end section of the inner column is supported by the vehicle body such that pivoting around a horizontal axis is possible; the second through holes are long holes in the vertical direction that are long in the vertical direction and have a partial arc shape around the horizontal axis as a center; the vertical position of the steering wheel can be adjusted within the range that the tightening rod can displace inside the long holes in the vertical direction; by operating an adjustment lever that is located at the base end section of the tightening rod, the space between the pair of pressure sections is expanded or contracted, such that when the space is contracted, the space between the pair of holding plate sections is decreased, causing a friction fit between the inside surface of these holding plate sections and the outside surface of the held wall sections, and the vertical position of the outer column is fastened.

Furthermore, preferably a plurality of ribs that axe long in the axial direction are formed around the outer circumferential surface of the inner column such that the outer circumferential surface of the inner column and the inner circumferential surface of the outer column come in contact at the apexes of these ribs.

Also, preferably, by forming a spline fit between male spline teeth that are formed around the outer circumferential surface on the end section of the inner shaft and female spline teeth that are formed around the inner circumferential surface on the end section of the outer shaft, extension and contraction is possible along the entire length of the spline shaft; and a coating layer of synthetic resin having a low friction coefficient is formed on the surface of at least one of the male spline teeth and female spline teeth.

In addition, a cam member fits around the middle section of the tightening rod, and when the tightening rod has been rotated in a direction that increases the diameter of the front section of the outer column, the cam member passes through the axial slit that is formed in the front section of the outer column and enters inside a locking hole that is formed in the rear section of the inner column.

Effect of the Invention

With the present invention, an impact absorbing steering apparatus is achieved that is capable of obtaining excellent performance at low cost, while maintaining freedom of design. In other words, with the construction of the present invention, even when the tightening rod is located on the upper side or lower side of the outer column, the tightening rod and energy absorbing member can be arranged in series with each other in the axial direction of the outer column, so it is possible to prevent or reduce a moment in the pivot direction from being applied to the outer column during a secondary collision. As a result, it is possible to stabilize the friction fit in the connection between the front section of the outer column and the rear section of the inner column, stabilize the sliding movement of that connection, and stabilize the absorption of impact energy during a secondary collision. Therefore, it is possible to improve the impact absorption performance without losing freedom of design.

Moreover, in order to absorb impact energy during a secondary collision, not only is friction resistance in the area of engagement between the inner circumferential surface of the front section of the outer column and the outer circumferential surface of the rear section of the inner column, but also plastic deformation of the energy absorbing member, or the plastic resistance and shear resistance that tears the pair of thin sections when the bent back section of the energy absorbing member displaces in the forward direction is used, so it becomes easier to stabilize the performance of absorbing impact energy, and it is possible to more easily tune this absorption performance.

Particularly, in the impact absorbing steering apparatus of the present invention, the bent back section of the energy absorbing section of the energy absorbing member is constructed such that it curves from the base plate section toward the inside of the space between the held wall sections of the outer column, and this allows the tip end section of this bent back section and the rear end installation section formed to this tip end to be placed inside the above space. As a result, it is possible to install the energy absorbing member such that it is more compact, and when there is deformation during a collision of the harness for electronic parts or the column cover that are located near the energy absorbing member, it becomes difficult to become affected by that deformation, and thus absorption of impact energy can be performed stably.

Furthermore, by installing a separate guide plate, or providing bent plate sections on the both side edges of the base plate section in the energy absorbing member, a guide space is formed, and when the energy absorbing section of the energy absorbing member is located in the guide space, the energy absorbing section is covered during a secondary collision, and damage when a collision occurs is similarly prevented, thus absorption of impact energy can be performed even more stably.

BRIEF DESCRIPTION OF THE DRAWINGS

FIG. 7A is a perspective view illustrating the state as seen from the upper front, and FIG. 7B is a perspective view illustrating the state as seen from the lower front.

FIG. 8A illustrates the normal state, and FIG. 8B illustrates the state after a secondary collision occurs.

FIG. 16A is a perspective view illustrating the state as seen from the lower front, and FIG. 16B is a perspective view illustrating the state as seen from the upper front, FIG. 16C is a cross-sectional view of section e-e in FIG. 16A, and FIG. 16D is a perspective view of a different example of the energy absorbing member, and illustrates the state as seen from the lower front.

FIG. 17A illustrates the normal state, and FIG. 17B illustrates the state after a collision.

FIG. 19A illustrates the state as seen from the upper front, and FIG. 19B illustrates the state as seen from the lower rear.

FIG. 25A is a partial side view, and FIG. 25B is a cross-sectional view of section f-f thereof.

FIG. 26A illustrates the normal state, and FIG. 26B illustrates the state after a secondary collision.

MODES FOR CARRYING OUT THE PRESENT INVENTION

Figure 1:
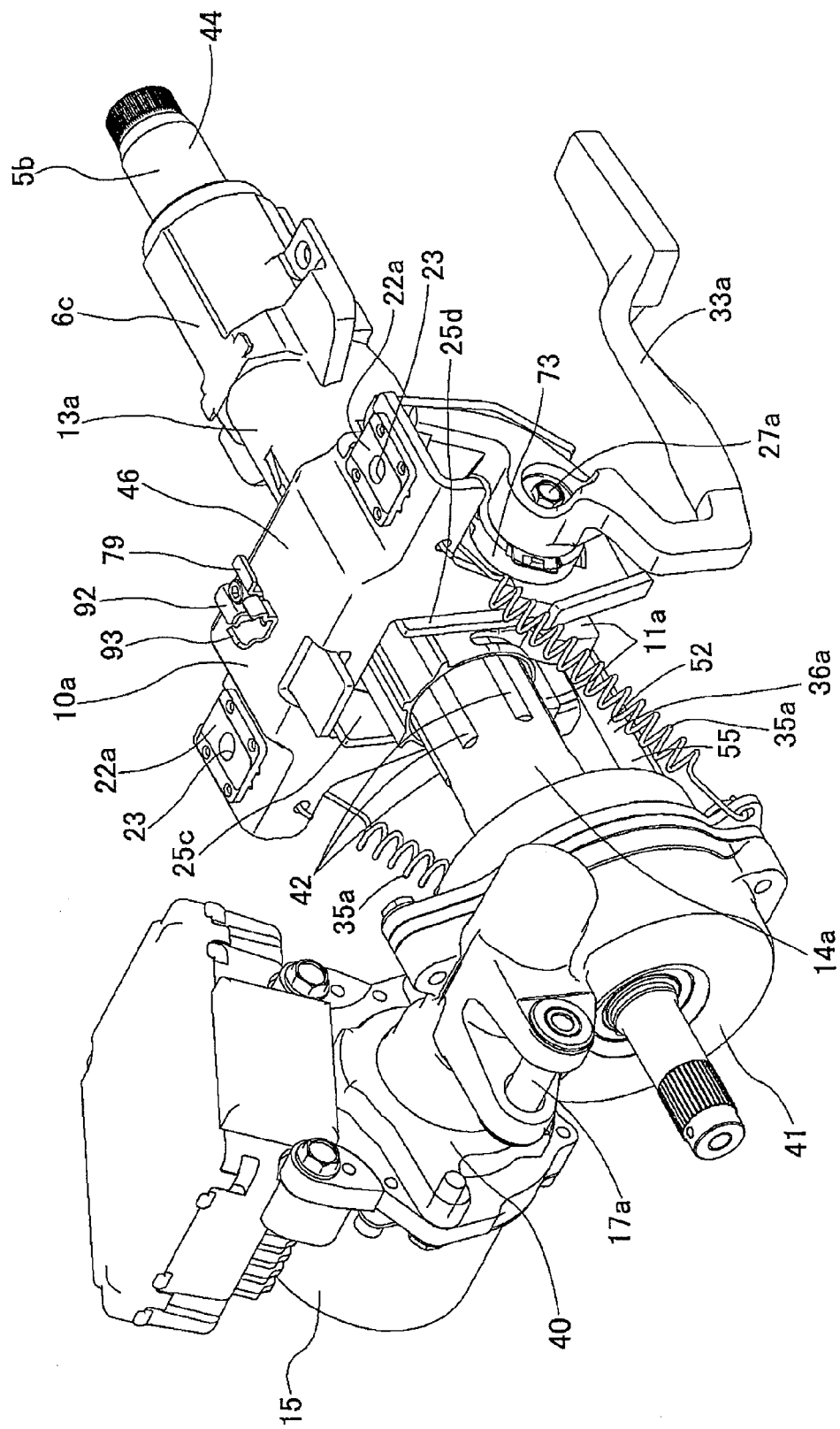
FIG. 1 is a perspective drawing illustrating the normal state of a steering apparatus of an example of a first embodiment of the present invention as seen from the upper front.

In explaining the present invention, a few detailed embodiments will be presented, and these embodiments will be explained in detail with reference to the drawings. However, the present invention is not limited to these embodiments.

[Embodiment 1]

An example of a first embodiment of the present invention will be explained with reference to FIG. 1 to FIG. 9. The impact absorbing steering apparatus of this embodiment comprises: an inner column 14a, an outer column 13a, a steering shaft 5b, a pair of held wall sections 11a, a pair of long holes 28 in the forward/backward direction, a support bracket 10a, a pair of long holes 26a, 26b in the vertical direction, a tightening rod 27a, a cam unit 32a as a fastening means, and an energy absorbing member 36a. In the definition of the present invention, the long holes 28 in the forward/backward direction correspond to first through holes, and the long holes in the vertical direction correspond to second through holes. The shape of these first through holes and second through holes can be changed depending on whether or not the steering apparatus comprises a telescoping mechanism and/or tilting mechanism. In construction that does not comprise these mechanisms, one or both of the first through holes and second through holes can be simple circles.

The inner column 14a, in a state wherein the forward/backward position is regulated, or in other words, in a state where there is no forward displacement even during a secondary collision, is located further toward the front side than the outer column 13a. More specifically, the front end section of the inner column 14a is connected and fastened to the rear end section of a housing 41 that houses components such as the reduction gear of an electric powered steering apparatus 40. This housing 41 is formed by die casting an aluminum alloy for example, and has a though hole for inserting the front end section of the steering shaft 5b formed in the rear wall section. Moreover, a cylindrical wall section that protrudes toward the rear is formed on the edge section around this through hole. The front end section of the inner column 14a is connected and fastened to the housing 41 by fitting tightly around this cylindrical wall section, with the edge of the front end coming in contact with the rear wall section. The inner column 14a is an overall cylindrical shape, and a plurality of ribs 42 that are long in the axial direction (preferably an even number, there are six in the example in the figure) are formed around the outer circumferential surface, except for the portion on the front end section, such that they are evenly spaced in the circumferential direction.

The outer column 13a is formed as a single piece by die casting of an aluminum alloy for example. The front section of this outer column 13a fits around the rear section of the inner column 14a to form a steering column 6c that can extend and contract. In the case of this embodiment, the inner circumferential surface of the outer column 13a and the outer circumferential surface of the inner column 14a come in contact with each other by the apex sections of the ribs 42. In this state, it is possible to adjust and fasten the forward/backward position of the outer column 13a with respect to the inner column 14a. In order for this, a slit 43 in the axial direction is provided on the front section of the outer column 13a, which is the section that fits with the inner column 14a, and this slit 43 makes it possible for the diameter of this front section to expand or contract elastically. In this construction, the ribs provided on the inner column 14a have a constant protruding shape in the axial direction, so the area of contact between the outer circumferential surface of the inner column 14a and the inner circumferential surface of the outer column 13a become linear contact. With this construction, the sliding friction between the outer column 13a and the inner column 14a is reduced, and there is little change in the contact surface, so when an impact load is applied to the outer column 13a, it is possible to suppress fluctuation in the absorption of impact energy by this contact. Moreover, when the outer column is tightened and the diameter reduced, there is a little deformation in the shape, so mutual rotation between the outer column 13a and inner column 14a is prevented, and thus the position of the axial slit 43 in the outer column is stable.

By forming a spline fit between female spline teeth that are formed around the inner circumferential surface on the front half section of the outer shaft 44, which forms the rear half of the steering shaft 5b, and male spline teeth that are formed around the outer circumferential surface of the rear half of the inner shaft 45, which forms the front half of the steering shaft 5b, the steering shaft 5b is formed such that the entire length can be extended or contracted. A synthetic resin coating layer made of a synthetic resin having a low friction coefficient, such as polyimide resin (nylon), polytetrafluoroethylene resin (PTFE), polyacetal resin and the like, is formed on the surface of at least one set of teeth of the male spline teeth and female spline teeth. Therefore, the outer shaft 44 and inner shaft 45 are fitted together such that they are able to transmit torque, and are able to extend or contract under a light force. With this construction, the sliding friction between the outer shaft 44 and the inner shaft 45 is reduced. This kind of steering shaft 5b is supported on the inner diameter side of the steering column 6c such that it can rotate freely. More specifically, the portion near the rear end in the center section of the outer shaft 44 is supported by a rolling bearing, such as a single-row deep groove ball bearing that can support both a radial load and an axial load, so that it can rotate freely. Therefore, the outer shaft 44 moves as the outer column moves in the axial direction of the outer column 13a, and the steering shaft 5b extends or contracts.

The pair of held wall sections 11a is provided on the bottom surface of the front section of the outer column 13a on both the left and right sides of the axial slit 43, and is integrated with the outer column 13a. At a position where these held wall sections 11a are aligned with each other, the long holes 28 in the forward/backward direction are formed in the axial direction of the outer column 13a. In the example in the figure, the axial slit 43 and held wall sections 11a are provided on the lower side of the outer column 13a, and the tightening rod 27a and fastening unit for expanding or constricting the front section of the outer column 13a are arranged on the lower side of the outer column 13a, however, the present invention is not limited to this form, and the invention can also be applied to construction in which the axial slit and held wall sections are provided on the upper side of the outer column, and the tightening rod and fastening unit for expanding or constricting the front section of the outer column are provided on the upper side of the outer column.

The support bracket 10a has a pair of left and right holding plate sections 25c, 25d and an installation plate section 48. The holding plate sections 25c, 25d and the installation plate section 48 are all formed by pressing a metal plate such as a carbon steel plate having sufficient strength and rigidity, and are connected and fastened together by a method such as welding. The holding plate sections 25c, 25d hold the held wall sections 11a that are provided on the bottom surface of the outer column 13a (the top surface in construction in which there is an axial slit on the upper side of the outer column) on both the left and right sides. The installation plate section 48 supports the outer column 13*a* with respect to the vehicle body by way of these held wall sections 11*a*, and during a secondary collision, allows the outer column 13*a* to displace in the forward direction. In order for this, as in the conventional construction illustrated in FIG. 21 to FIG. 24, capsules 22*a* are installed in a pair of cutout sections 21*a* that are formed in the left and right end sections of the installation plate section 48 such that the capsules 22*a* can drop due to an impact load that is applied during a secondary collision.

Figure 20:
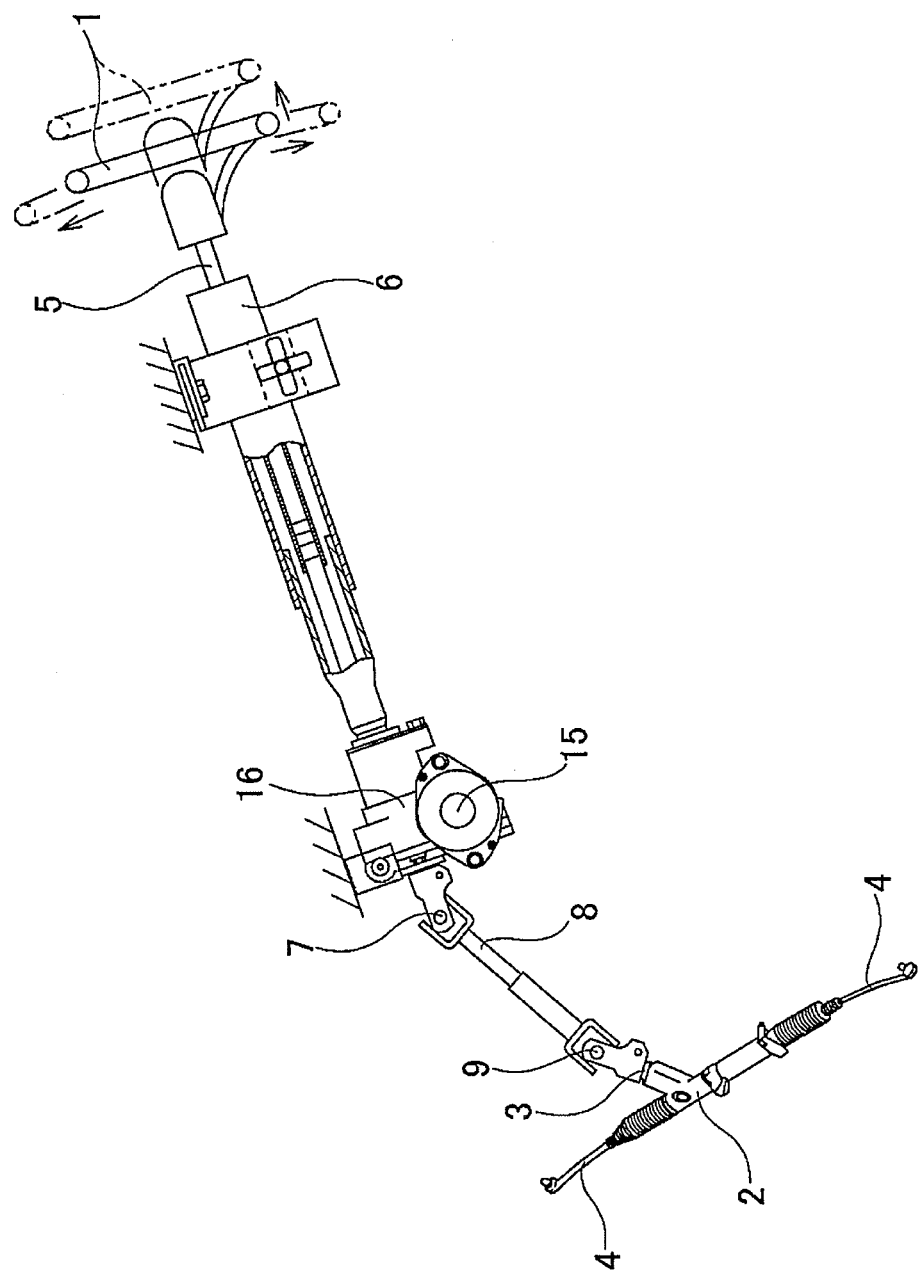
FIG. 20 is a partial cross-sectional side view illustrating an example of a conventional steering apparatus.
Figure 21:
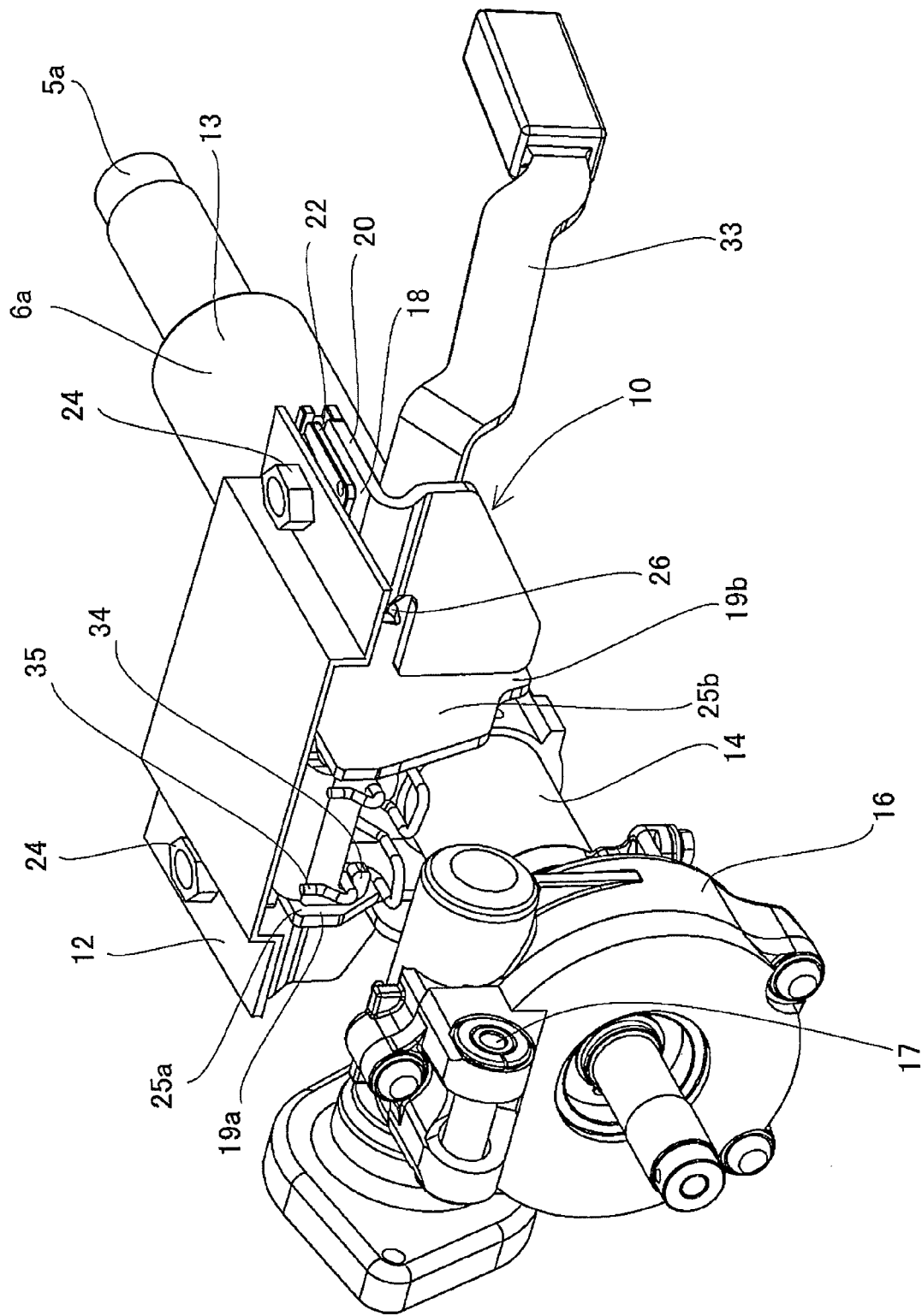
FIG. 21 is a perspective view of an example of a conventional impact absorbing steering apparatus, and illustrates the state as seen from the upper front.
Figure 22:
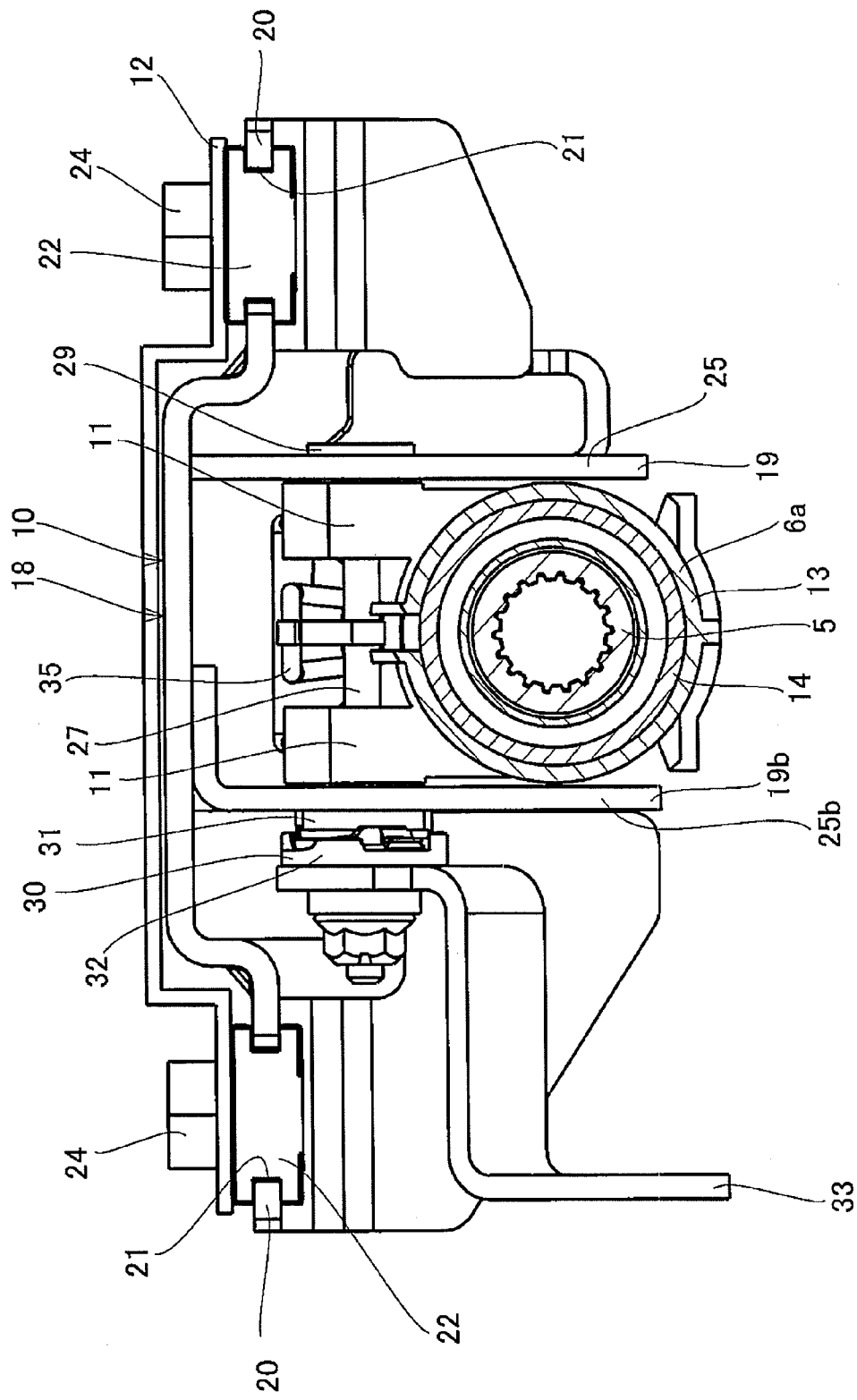
FIG. 22 is a cross-sectional view of the steering apparatus in FIG. 21.
Figure 23:
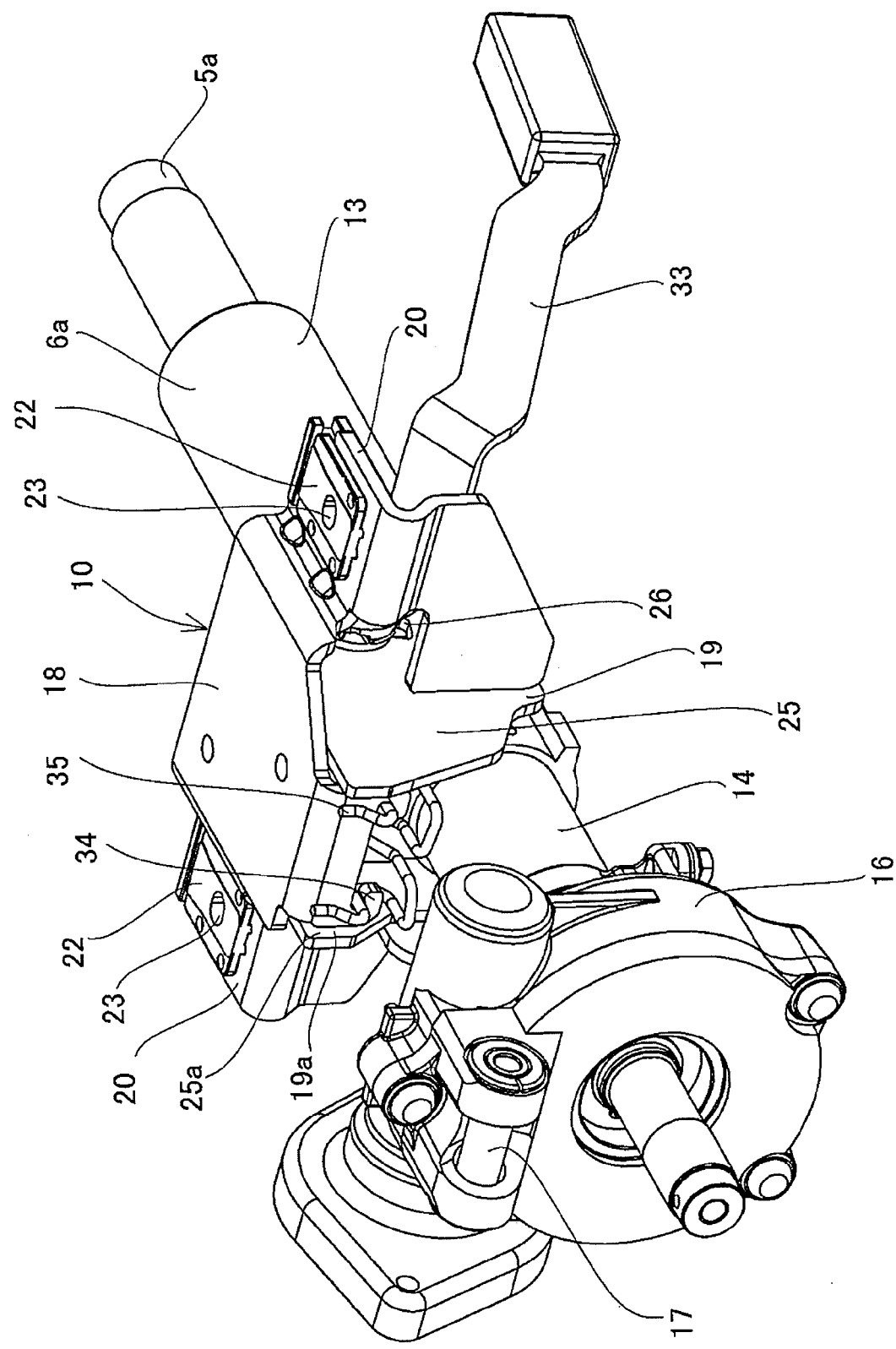
FIG. 23 is a perspective view similar to the perspective view of the steering apparatus in FIG. 21 with the bracket on the vehicle side omitted.
Figure 24:
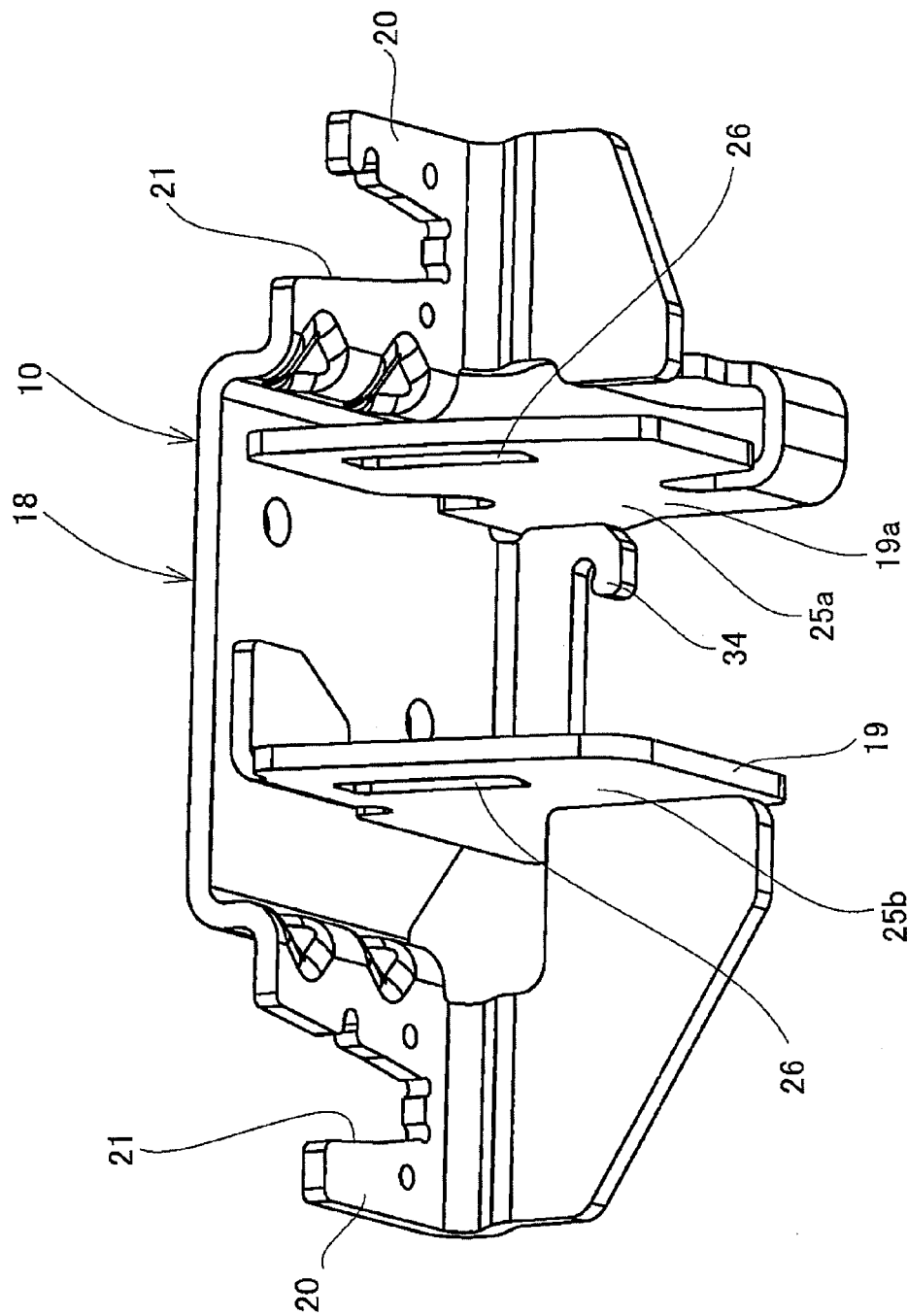
FIG. 24 is a perspective view of the support bracket of the steering apparatus in FIG. 21, and illustrates the state as seen from the lower rear.
Figure 25:
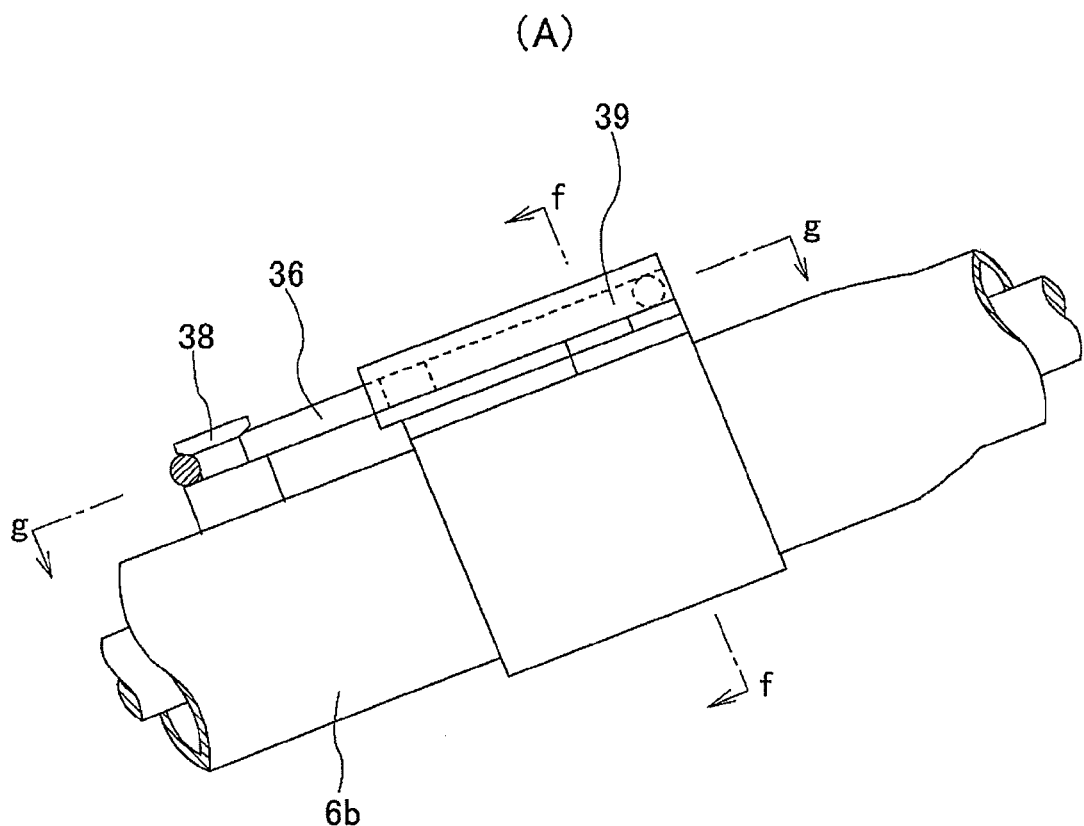
FIGS. 25A and 25B are partial cross-sectional views of the steering column section of an impact absorbing steering apparatus in which a conventional energy absorbing member is installed, where
Figure 25:
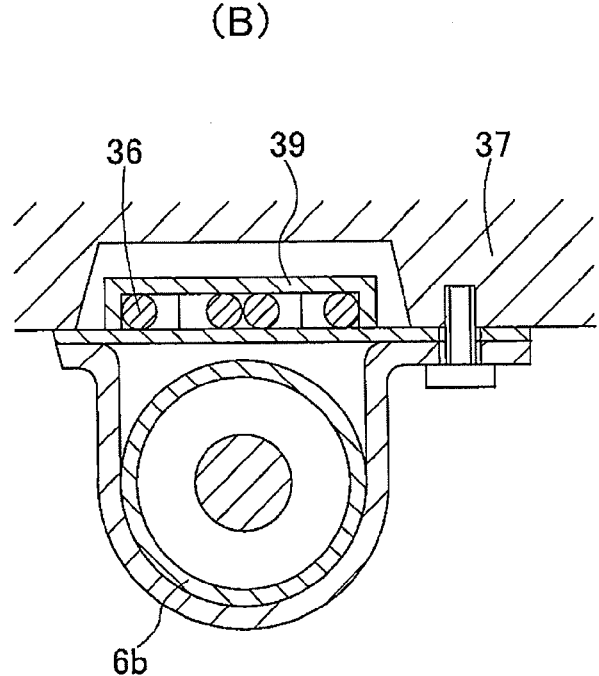
Figure 26:
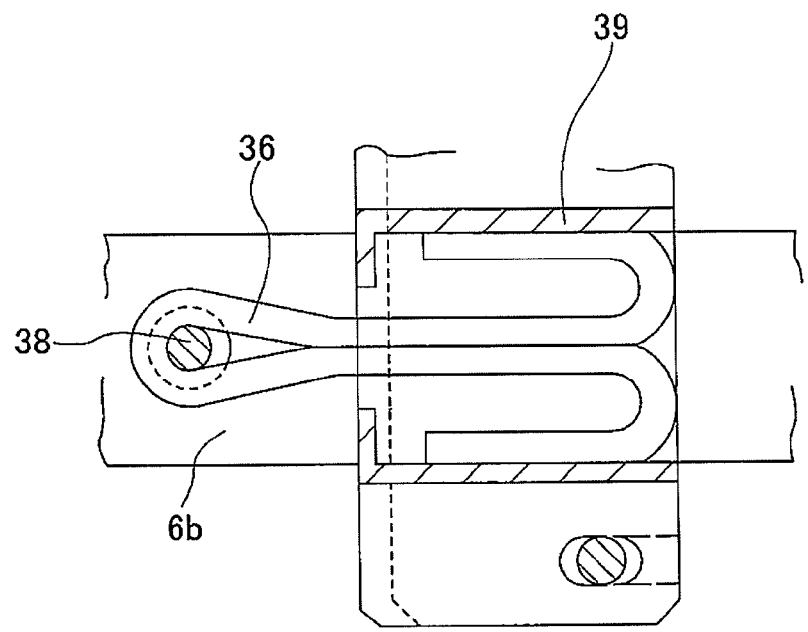
FIGS. 26A and 26B are cross-sectional views of section g-g of the steering column section of the steering apparatus in FIG. 25A, where
Figure 26:
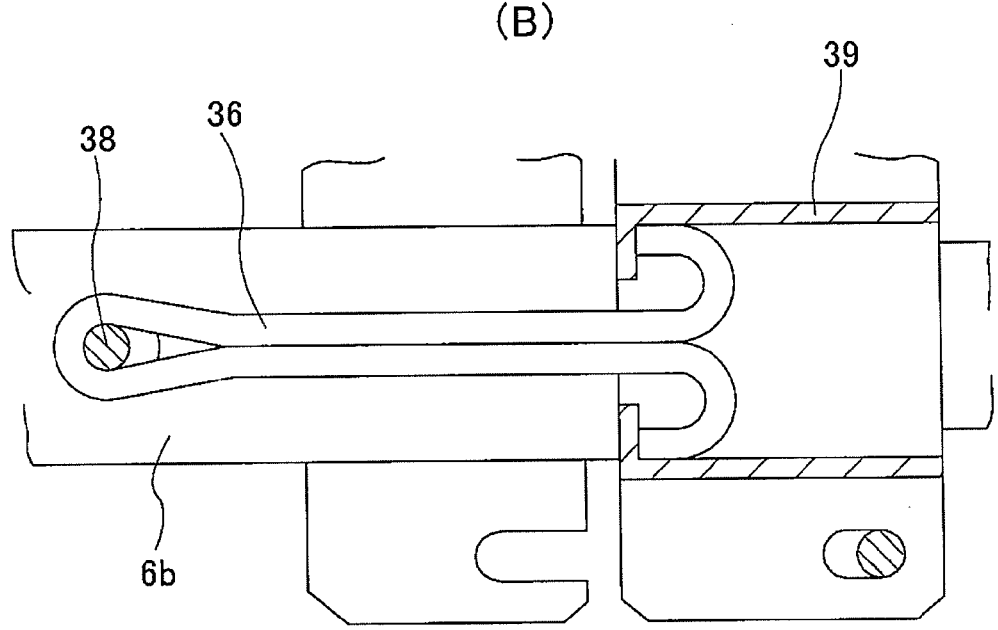

The long holes 26*a*, 26*b* in the vertical direction are formed in a partial arc shape around a center axis of the support pipe 17*a* that is provided in the front upper portion of the housing 41 and functions as a horizontal axis in the present invention, and are formed in the portion of the holding plate sections 25*c*, 25*d* that are aligned with part in the length direction of the long holes 28 in the forward/backward direction. The tightening rod 27*a* is inserted through the long holes 28 in the forward/backward direction and the long holes 26*a*, 26*b* in the vertical direction. On the portion near the tip end side of the center section of the tightening rod 27*a* (portion near the right in FIG. 4 and FIG. 6), in order from the side near the center of the tightening rod 27*a*, a tilt spacer 47, spacer 48, washer 49 and thrust bearing 50 are fitted around the tightening rod 27*a*. By screwing a nut 51 onto the tip end section of this tightening rod 27*a*, these members 47 to 50 are prevented from coming apart from the tightening rod 27*a*. By performing crimping deformation of any part of the nut 51 after being screwed onto the necessary location, the nut 51 is prevented from coming loose. The members 47 to 50 are provided in order that when adjusting the position of the steering wheel 1 (FIG. 20), displacement of the tightening rod 27*a* and displacement of the tip end section of the tightening rod 27*a* along the long hole 26*a* in the vertical direction can be performed smoothly.

On the other hand, a cam unit 32*a* that comprises a drive cam 30*a* and a driven cam 31*a* is provided on the base end section of the tightening rod 27*a*. In this example, the driven cam 31*a* and the nut 51 form a pair of pressure units in the present invention. In the cam unit 32*a*, the adjustment lever 33*a* rotates and drives the drive cam 30*a*, and the distance between the driven cam 31*a* and nut 51 can be increased or decreased. The driven cam 31*a* engages to the long hole 26*b* in the vertical direction from the outside surface side of the holding plate 25*c*1, in a state where the displacement (raising or lowering) along this long hole 26*b* in the vertical direction is possible, but the rotation therein is prevented. When adjusting the position of the steering wheel 1, by rotating the adjustment lever 33*a* in the downward direction, the distance between the driven cam 31*a* and the nut 51 is increased. As a result of this distance increasing, the contact pressure between the surface on the inside of the holding plate sections 25*c*, 25*d* and the surfaces on both the left and right sides of the outer column 13*a*, including the held wall sections 11*a*, decreases or is lost. At the same time, the diameter of the front section of the outer column 13*a* is elastically expanded, and the contact pressure between the inner circumferential surface of the front section of the outer column 13*a*, and the outer circumferential surface of the rear section of the inner column 14*a* decreases.

In this state, the outer column 13*a* is displaced within the range that the tightening rod 27*a* can displace inside the long holes 26*a*, 26*b* in the vertical direction and the long holes 28 in the forward/backward direction. The position of the steering wheel 1 that is supported by and fastened to the rear end section of the outer shaft 44 that is supported inside the outer column 13*a* such that it rotates freely, or in other words, at least one of the position of the steering wheel 1 in the forward/backward direction and the position in the vertical direction is adjusted. While the work of adjustment is performed, the weight of the portion that raises or lower with the outer column 13*a* is supported by a pair of equalizer springs 35*a*, which are tension springs, that are provided between the housing 41 and the installation plate section 46 of the support bracket 10*a*. Therefore, it is not necessary for the driver to carry the entire weight of this portion when adjusting the position of the steering wheel 1. After the steering wheel 1 has been moved to a desired position, the adjustment lever 33*a* is rotated upward, which decreases the distance between the driven cam 31*a* and the nut 51. As a result, the contact pressure between the inside surfaces of the holding plates 25*d*, 25*d* and the left and right side surfaces of the outer column 13*a*, and the contact pressure between the inner circumferential surface on the front section of the outer column 13*a* and the outer circumferential surface on the rear section of the inner column 14*a* increase, and the position of the outer column 13*a* is fastened in the desired position.

Furthermore, the energy absorbing member 36*a*, which is a unique feature of this example, is provided between the middle section in the axial direction of the tightening rod 27*a*, which is the portion that displaces in the forward direction together with the outer column 13*a* during a secondary collision, and the rear end surface of the housing 41 of the electric powered steering apparatus 40. The energy absorbing member 36*a* is formed as a single piece as illustrated in FIGS. 7A, 7B by punching and bending in a pressing process of metal plate such as soft steel plate that has sufficient strength and rigidity for absorbing impact energy, as well as can be plastically deformed. The following explanation is based on the construction of this example, however, as in the conventional construction illustrated in FIG. 21 to FIG. 24, in construction where the tightening rod and fastening unit are located above the steering column, the positional relationship in the vertical direction of the members is reversed in the explanation below.

More specifically, the energy absorbing member 36*a* comprises: a support beam section 52, an energy absorbing section 53, and a pair of left and right front end side installation sections 54. The support beam section 52 has high bending rigidity in the axial direction of the outer column 13*a*. In other words, it has bending rigidity such that during a secondary collision there is no buckling deformation due to an impact load that is applied in the axial direction of the outer column 13*a*. In order for this, in the case of this embodiment, the support beam section 52 comprises a base plate section 55, and bent plate section 56 that is formed by bending up one side edge in the width direction of the base plate section 55 at a right angle to the base plate section 55, and by having an L-shaped cross section, the section modulus of the support beam section 52 is increased. It is also possible to just form a base plate section 55 without the bent plate section 56. On the other hand, it is also possible to bend up both side edges of the base plate section 55 so that the support beam section 52 has a U-shaped cross section.

The energy absorbing section 53 is located further in the rear than the support beam 52 and has a U-shaped bent back section 57 in the middle section. In this embodiment, this bent back section 57 is bent back 180 degrees upward with respect to the base plate section 55 (downward when applied to construction where the slit is on the upper side of the outer column) from the rear end edge of the portion that extends toward the rear from the base plate section 55 of the support beam section 52 to form a U shape. Therefore, the tip end section of the energy absorbing section 53 is located further upward (or downward) than the support beam section 52. A pair of left and right protruding sections 58 that are bent upward (or downward) at right angles from the edges on both side are also formed on the tip end section of this energy absorbing section 53. Furthermore, circular through holes 59 through which the tightening rod 27a is passed are formed in these protruding sections 58. In the definition of the present invention, these protruding sections correspond to the rear side installation sections, and the through holes 57 correspond to the third through holes. However, the construction of the rear side installation sections is not limited to the construction in the figures. For example, the tip end sections of the bent section 53 could be ring shaped, and the tightening rod 27a could be passed through the rings, or a means could be employed of fastening the protruding sections 58 to the inside surfaces of the held wall sections 11a of the outer column 13a.

The pair of left and right front end installation sections 54 are formed by bending the tip end sections of the portions that are bent forward from the edges on both the left and right sides of the bent up plate section 60, which is formed by bending the front end section of the support beam section 52 upward (or downward), at right angles towards opposites sides from each other, to form protruding plate sections. Installation holes 61 are formed in the tip end section of the front end installation sections 54. The eccentricity of these installation holes 61 with respect to the support beam section 52 is near the same as the eccentricity of the through holes 59. In this embodiment, a stiffening bead 62 is formed in the connecting section between the support beam section 52 and the bent up plate sections 60, and that improves the bending rigidity of this connecting section.

On the other hand, a guide plate 63 is fastened to the portion on the bottom surface of the front section of the outer column 13a that faces the slit 43. In the definition of the present invention, this guide plate 63 corresponds to the guide section. The guide plate 63 is formed from a metal plate having sufficient strength and rigidity, and has a crank shaped cross section that is formed by bending, and comprises: an installation plate section 64 that is located on the top side, a hanging down plate section 65 that is bent at a right angle downward from the edge on the side of the installation plate section 64, and a guide plate section 66 that is bent toward the opposite side of this installation plate section 64 from the edge on the bottom end of the hanging down plate section 64. A contact plate 67 that is bent at a right angle upward (or downward) from the installation plate section 64 is located on the rear end edge section of the installation plate section 64. This kind of guide plate 63 is such that, with the installation plate section 64 in contact with the bottom surface of one of the held wall sections 11a, and with the contact section 67 in contact with the rear end surface of one of the held plate sections 11a, the guide plate 63 is fastened to this held plate section 11a by a screw 68. In the example illustrated in the figure, this guide plate 63 is constructed such that it extends in the axial direction of the outer column 13a, however is not limited to this construction, and a rib construction of which the length in the axial direction is short can be adopted, and also the structure can be adopted where a plurality of guide plates having this rib construction respectively axe arranged in the axial direction of the outer column 13a.

In this state, a guide space 69 is provided between the center section in the width direction on the bottom surface of the outer column 13a (section between the held plate sections 11a on both sides) and the upper surface of the guide plate section 66. In this embodiment, center section in the width direction on the bottom surface of the outer column 13a and the upper surface of the guide plate section 66 are parallel to each other, and the height dimension on the guide space 69 is uniform in the forward/backward direction.

With the energy absorbing section 53 located inside the guide space 69, the energy absorbing member 36a is located between the outer column 13a and the housing 41. In order for this, the tightening rod 27a is inserted through the through holes 59 formed in the protruding sections 58. The rear section of the energy absorbing member 36a is connected to the outer column 13a by ways of the tightening rod 27a, and during a secondary collision, the rear end section of this energy absorbing member 36a displaces in the forward direction together with the outer column 13a. In this embodiment, the rear end section of the energy absorbing member 36a is fastened to the tightening rod 27a in this way, however, in this construction, the tightening rod 27a is supported by both the long holes 26a, 26b in the vertical direction of the outer column 13a, and this tightening rod 27a is repeatedly used for operating the titling mechanism, so the tightening rod 27a is hardened by heat treatment, has advantages of having high rigidity in bending, and does not allow fluctuation to occur in the absorption performance of absorbing energy by the energy absorbing member 36a.

On the other hand, bolts 70 that are inserted through the installation holes 61 in the front end installation section 54 screw into screw holes that are opened in the surface of the rear end of the housing 41, and by tightening the bolts 70, the front section of the energy absorbing member 36a is connected and fastened to the housing 41. When the front end section of the energy absorbing member 36a is supported by the housing 41 of an electric-powered steeling apparatus 40 in this way, this housing 41 is formed from a rigid body that is die cast using an aluminum alloy, so even when an impact load is applied, deformation of the installation section is prevented, so similarly it is possible to suppress fluctuation in the absorption of impact energy. Moreover, by using construction wherein the front end installation sections 54 function as contact plate sections, the rigidity of this section is improved, and from this aspect as well, it is possible to stabilize the absorption performance of absorbing impact energy.

Figure 2:
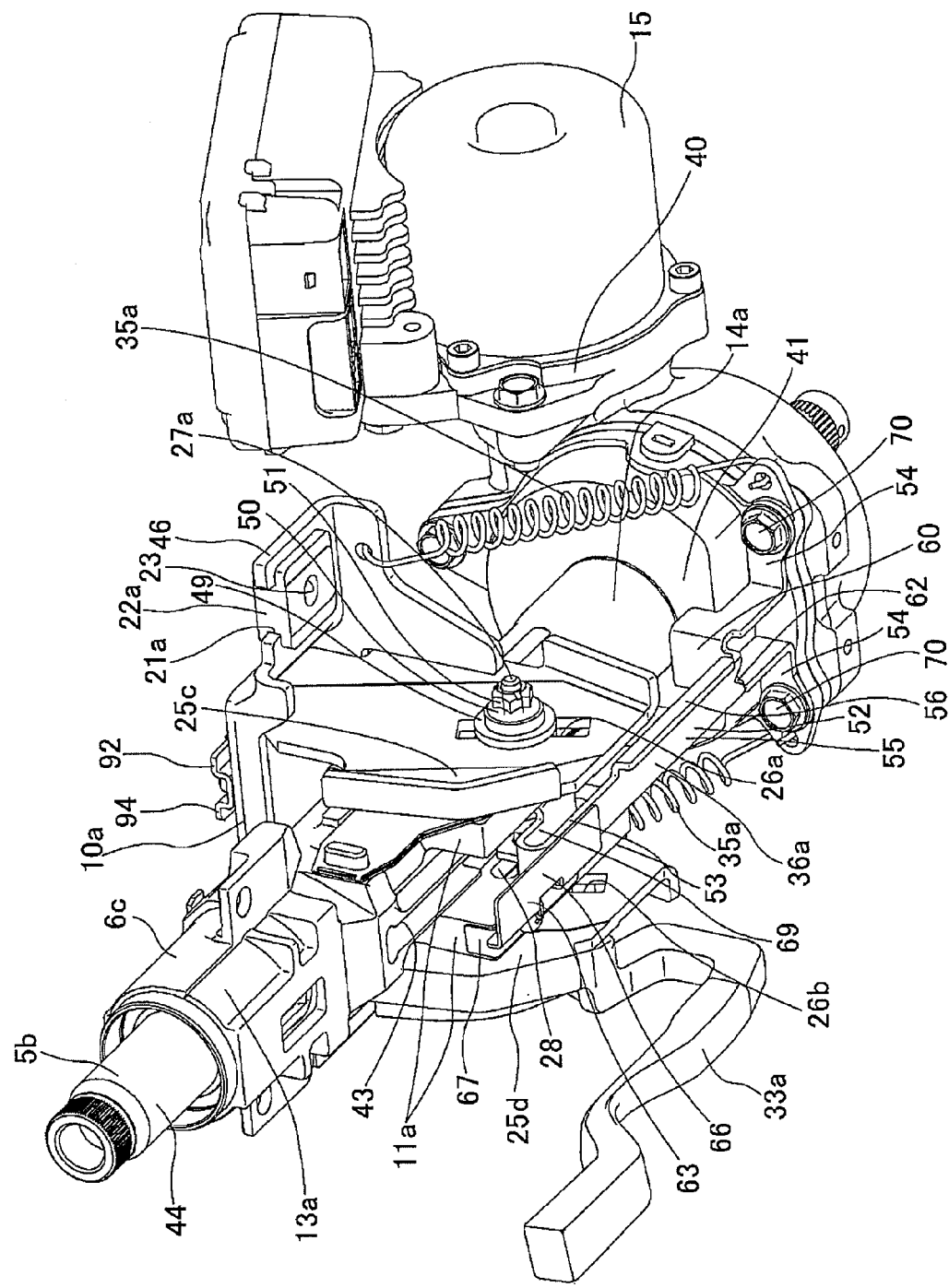
FIG. 2 is a perspective drawing illustrating the normal state of the steering apparatus in FIG. 1 as seen from the lower rear.
Figure 3:
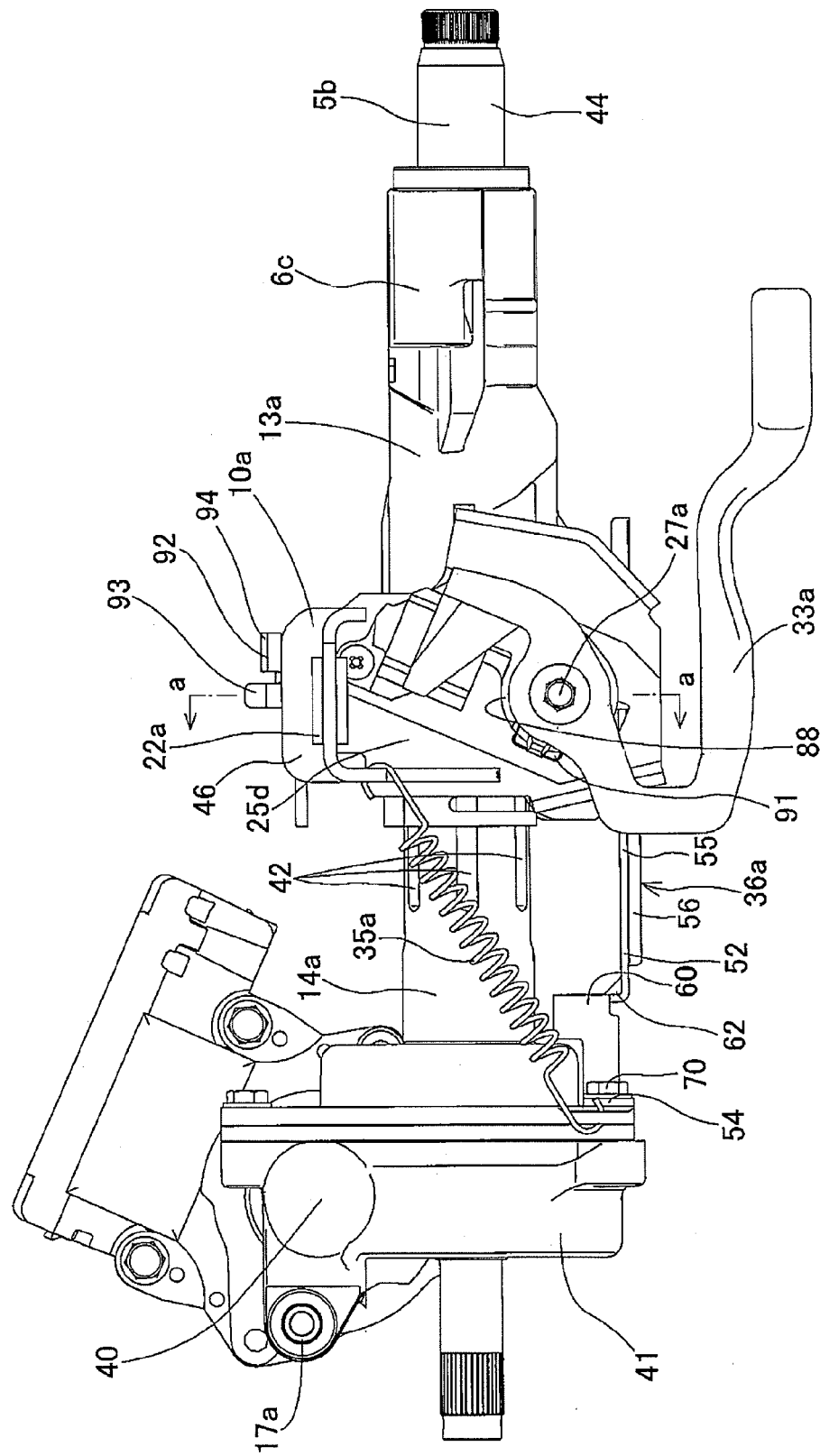
FIG. 3 is a side view of the normal state of the steering apparatus in FIG. 1.
Figure 4:
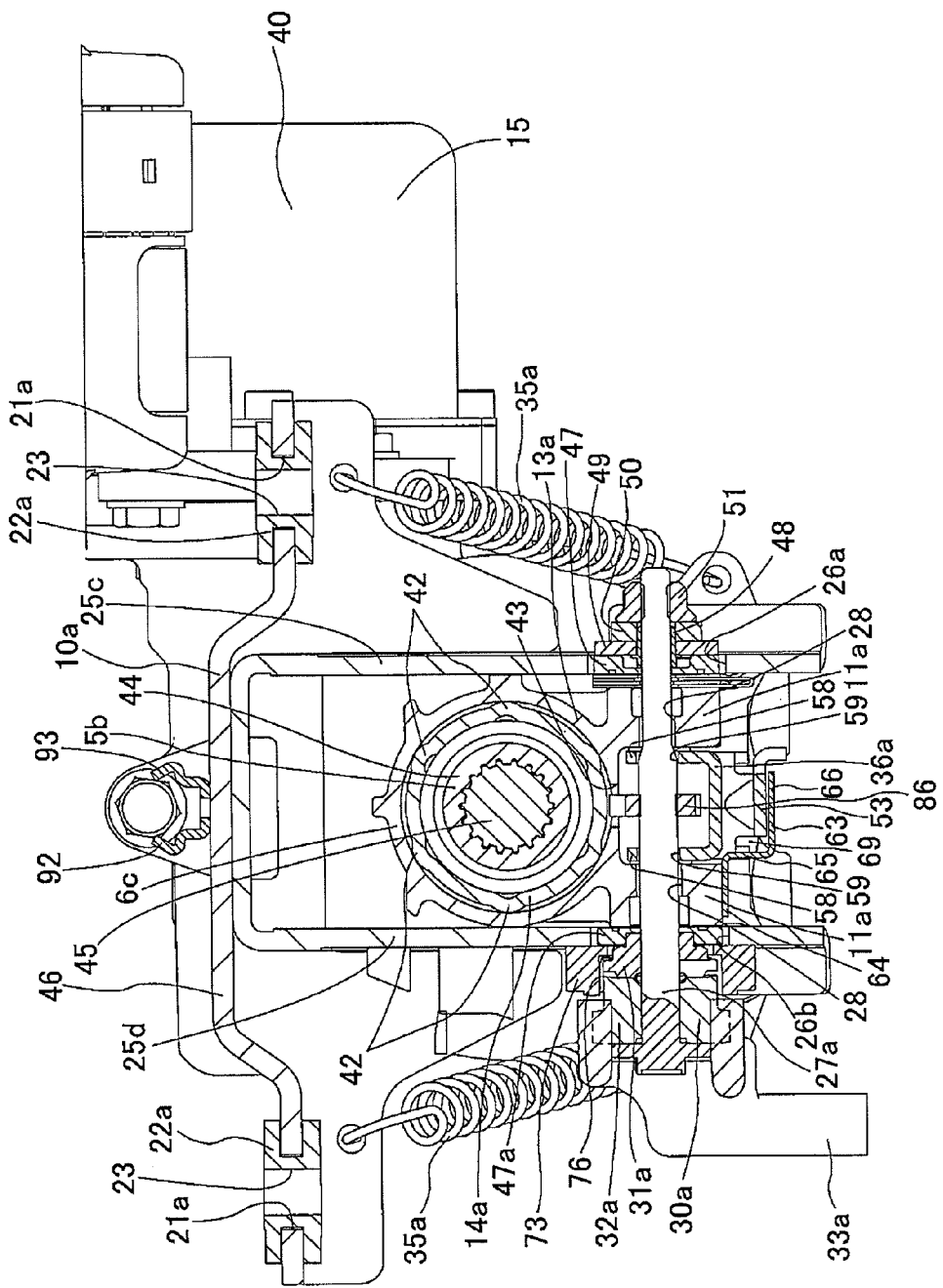
FIG. 4 is a cross-sectional view of section a-a in FIG. 3.
Figure 5:
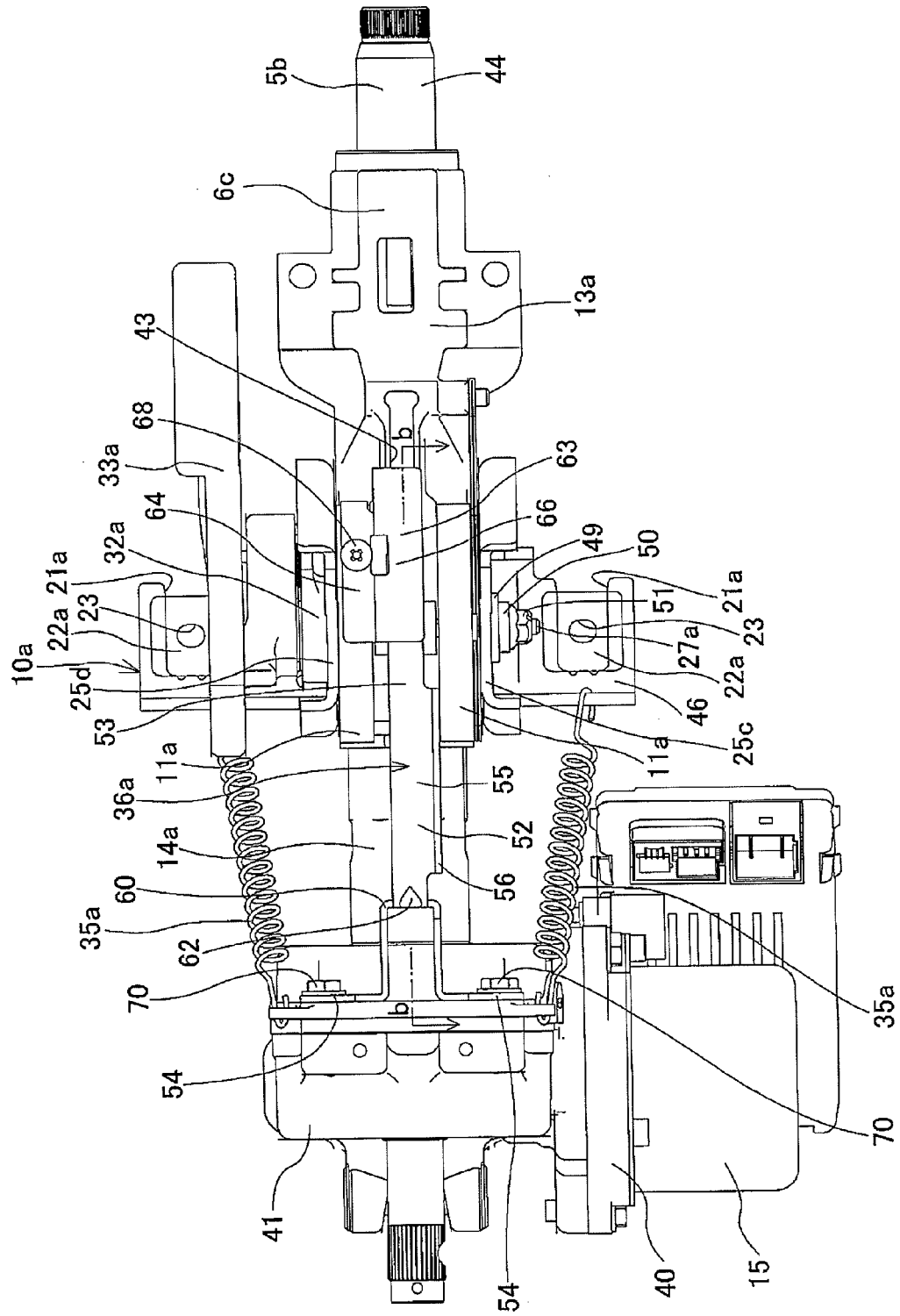
FIG. 5 is an orthographic projection illustrating the normal state in FIG. 1 as seen from the bottom.
Figure 6:
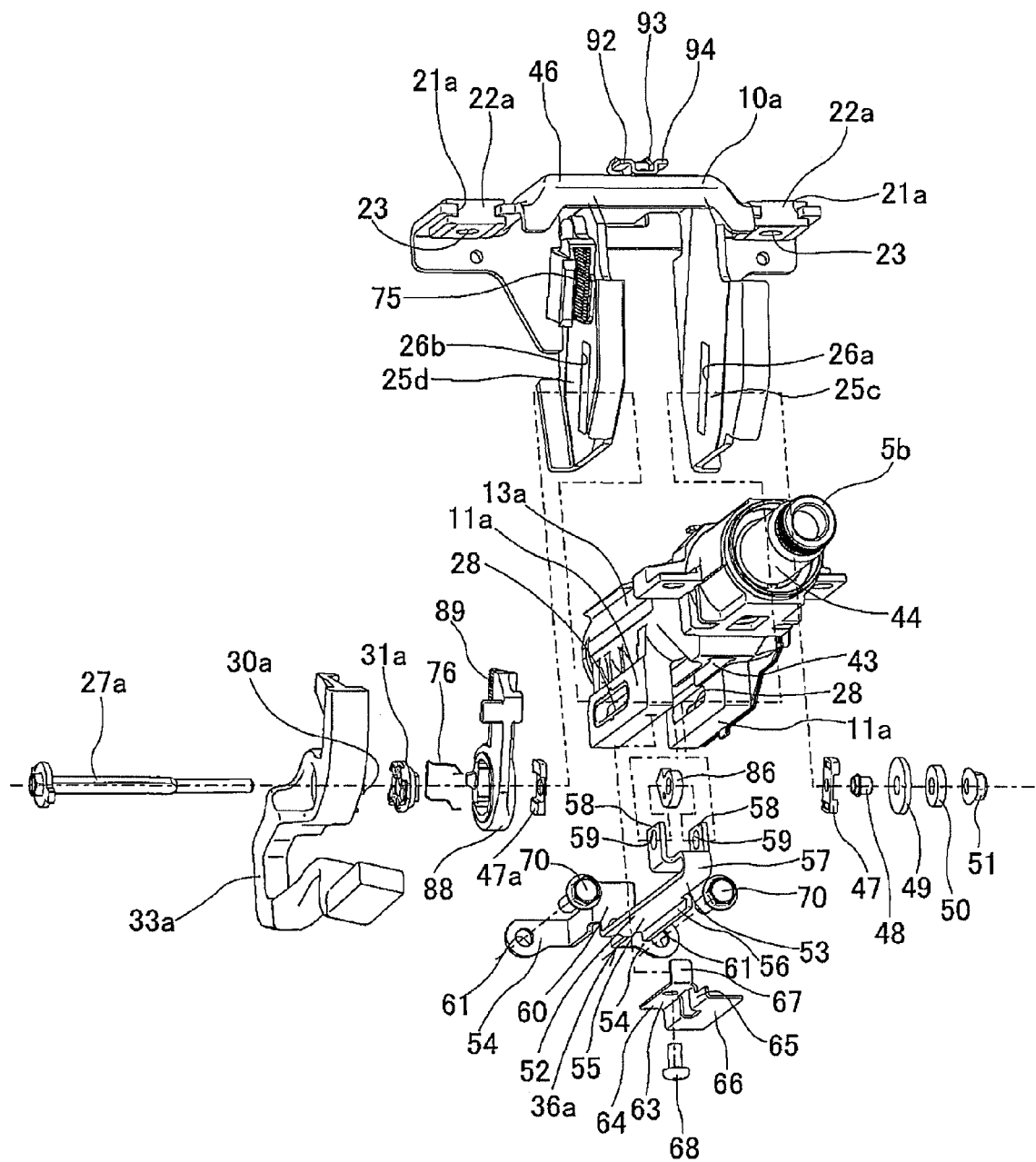
FIG. 6 is an exploded perspective view illustrating the state as seen from the lower rear, of the mechanism portion for adjusting the forward/backward position and vertical position of the outer column of the steering apparatus in FIG. 1.
Figure 7:
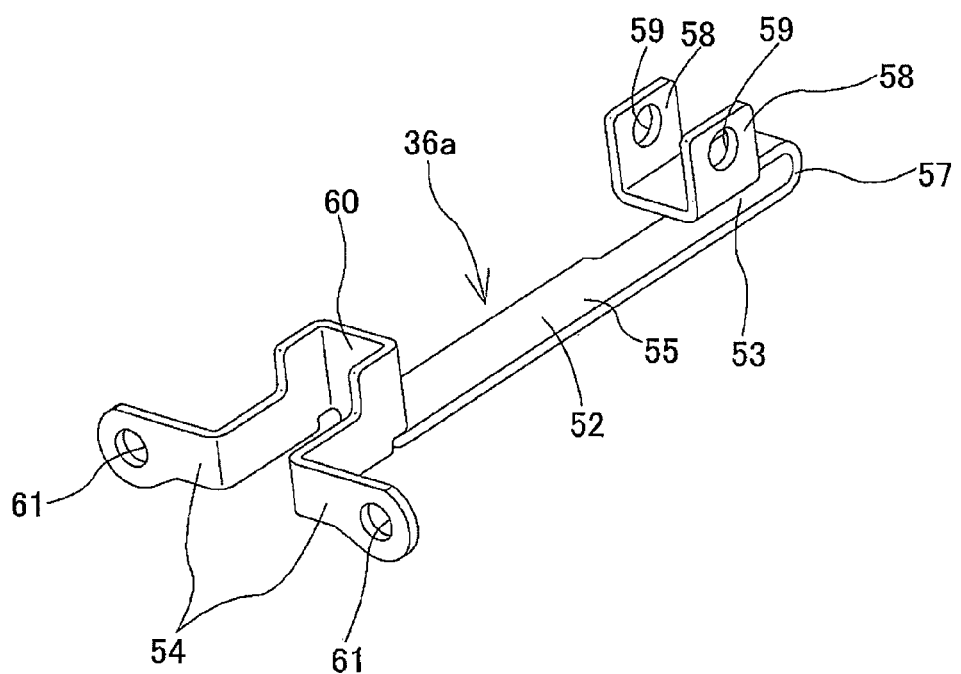
FIGS. 7A and 7B are perspective views illustrating an energy absorbing member of the steering apparatus in FIG. 1, where
Figure 7:
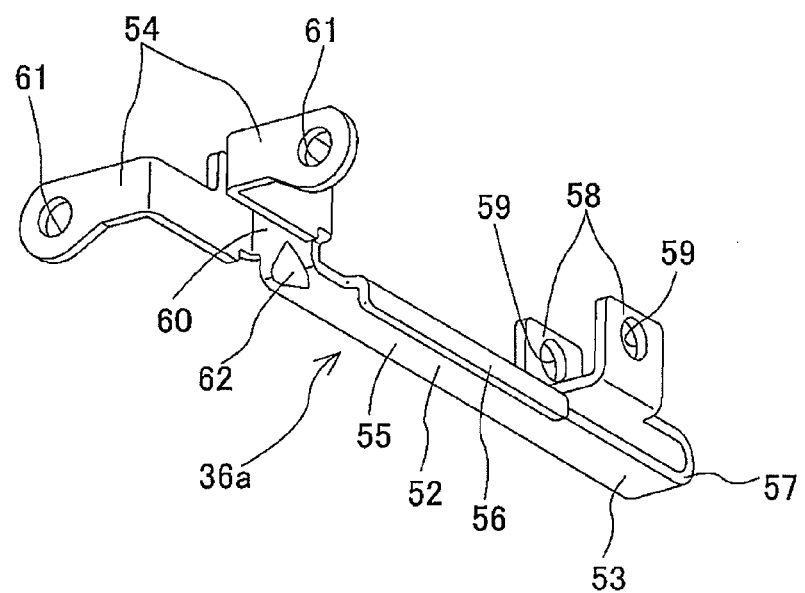
Figure 8:
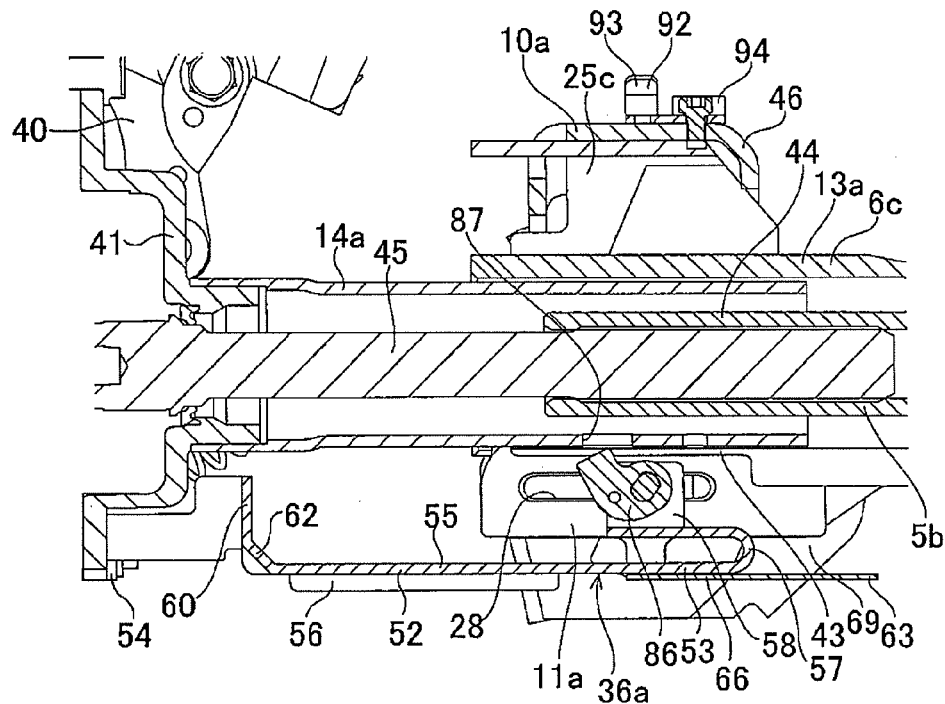
FIGS. 8A and 8B are cross-sectional views of section b-b in FIG. 5 of the steering apparatus in FIG. 1, where
Figure 8:
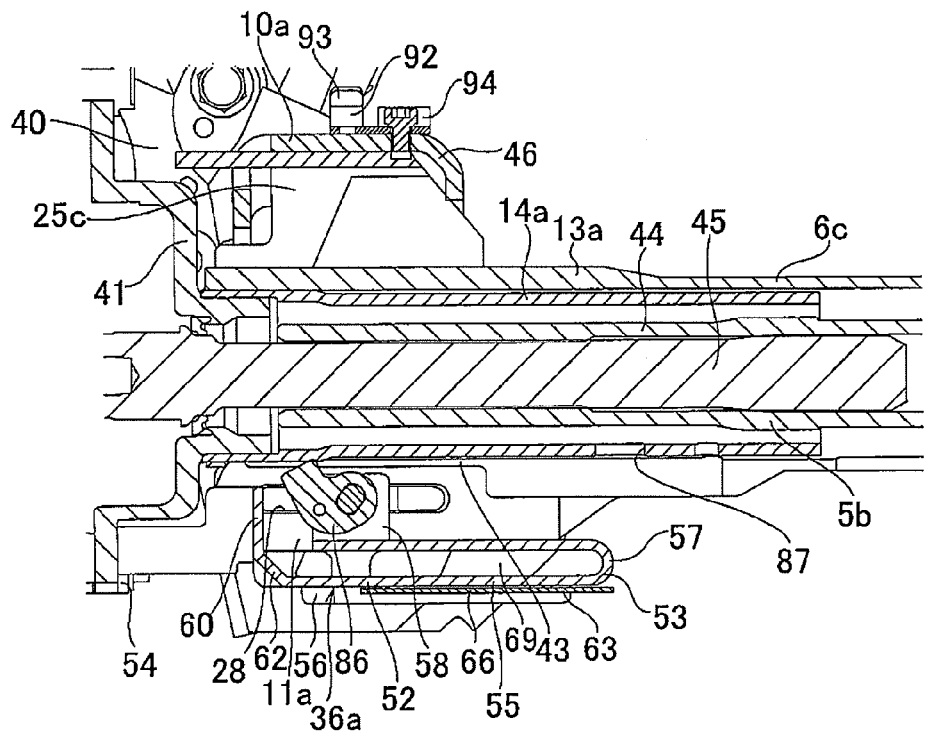

Having this kind of construction, the energy absorbing member 36a that is installed between the tightening rod 27a and the housing 41 as described above, plastically deforms from the state illustrated in FIG. 2, FIG. 5 and FIG. 8A to the state illustrated in FIG. 8B as a secondary collision proceeds. In other words, during a secondary collision, as the outer column 13a displaces in the forward direction further from the front end section within the range of the adjustable forward/backward direction, the energy absorbing section 53 is caused to plastically deform in a direction that causes the bent back section 57 to move in the forward direction, and allows displacement toward the front of the tightening rod 27a. When this happens, impact energy that is transmitted from the steering wheel 1 to the tightening rod 27a by way of the outer shaft 44 and outer column 13a is absorbed by this plastic deformation.

In this case, in the energy absorbing section 53 of the energy absorbing member 36a, the bent back section 57 is such that it bends from the base plate section 55 toward the inside between the held wall sections 11a of the outer column 13a, and tip end section of this bent back section 57 and the protruding sections 58 can be arranged inside the guide space 69. As a result, the guide space 69 is covered, so it is possible to compactly install the energy absorbing member 36a, and to make it difficult for there to be interference by parts such as the harness for electrical parts, the column cover and the like that are near the energy absorbing member 36a due to deformation during a collision.

Moreover, both the top and bottom sides of the guide space 69, where the energy absorbing section 53 is placed, are defined by the center section in the width direction of the bottom surface of the outer column 13a and the top surface of the guide plate section 66, so the energy absorbing section 53 does not deform in a direction expanding in the vertical direction, and movement of the bent back section 57 proceeds smoothly with no fluctuation, so energy absorption by the plastic deformation of this energy absorbing section 53 is performed stably. Furthermore, by placing the energy absorbing section 53 in this guide space, the energy absorbing section 53 is covered by the guide plate 63 during a secondary collision, so damage during the occurrence of an impact load similarly prevented. Particularly, in this embodiment, the guide plate 63 extends in the axial direction of the outer column 13a, so movement of the bent back section 57 is constrained by the guide plate 63, so fluctuation is eliminated and absorption of impact energy can be performed stably.

Moreover, in this embodiment, a cam member 86 fits around the middle section of the tightening rod 27a. As the adjustment lever 33a is rotated downward in order to adjust the forward/backward position of the steering wheel, and as the cam device 32a is loosened, the tip end section of this cam member 86 displaces upward (downward in the case of construction where the slit is on the upper side of the outer column). This tip end section passes through the slit 43 that is formed in the front section of the outer column 13a, and protrudes upward (or downward) from the inner circumferential surface of the outer column 13a and enters into a locking hole that is formed in the rear section of the inner column 14a (FIGS. 8A, 8B). In this state, when force is applied to the outer column 13a in the forward direction by way of the steering wheel 1 and steering shaft 5b, and the outer column displaces in the forward direction, the front edge of the tip end section of the cam member 86 engages with the front end edge of the locking hole 87. In this state, the force in the forward direction is supported by the vehicle body by way of the inner column 14a, and is not transmitted to the support bracket 10a by way of the tightening rod 27a. Therefore, when the cam device 32a is loose, the capsules 22a do not come out of the cut out sections 21a even when the outer column 13a is strongly pushed in the forward direction by way of the steering wheel 1 and outer shaft 44, and the support bracket 10a does not drop down from the vehicle body in the forward direction.

Furthermore, in this embodiment, construction for increasing the support strength for supporting the steering wheel 1 at a height position after adjustment is installed. In other words, the base section of a pivot arm 88 is fitted around the middle section of the tightening arm 27a near the base end such that it can pivot, and as the adjustment lever 33a is rotated upward, this pivot arm 88 is pivoted upward. A male side gear 89 is provided on the tip end section of this pivot arm 88 and a female side gear 90 is provided on the top section of the outside surface of the holding plate section 25d, and as the pivot arm 88 pivots upward, these gears 89, 90 engage. In this engaged state, the tightening rod 27a is connected to the holding plate section 25d by way of the pivot arm 88, so that regardless of a large impact load due to a secondary collision, the height position of the steering wheel 1 does not shift or move much.

The driven cam 31a is installed to the base section of the pivot arm 88 in a state such that relative rotation with respect to the pivot arm 88 is possible, or in other words, in a state such that relative rotation with respect to the holding plate section 25d is prevented, and such that a little displacement in the vertical direction with respect to the pivot arm 88 is possible. In order for this, a tilting spacer 47a, which is installed to the driven cam 31a such that relative rotation is not possible, is fitted such that only raising and lowering in the long hole 26b in the vertical direction is possible. A restoration spring 91 is located between the driven cam 31a and the pivot arm 88, and supports the driven cam 31a such that it can raise or lower a little with respect to this pivot arm 88 around the center position as the center. The reason for allowing this small amount of raising and lowering is that the height position of the steering wheel 1 can be adjusted smoothly in a single step, while the meshed position between the gears 89, 90 is in steps, so this small amount absorbs this difference.

With the construction of this example, constructed as described above, an impact absorbing steering apparatus can be obtained that is capable of excellent performance at low cost while maintaining the freedom of design. First, with construction in which the tightening rod 27a is placed on the bottom side of the outer column 13a as in the example in the figures, this tightening rod 27a and the energy absorbing member 36a can be arranged in series with each other in the axial direction of the outer column 13a. Even in construction where the tightening rod is placed at the top side of the outer column, the tightening rod and energy absorbing member can be arranged in series with each other in the axial direction of the outer column. When these members 27a, 36a are arranged in this way, a force that resists against displacement of the outer column 13a in the forward direction during a secondary collision, or in other words, resistance against plastic deformation of the energy absorbing member 36a is applied to the tightening rod 27a that becomes the center around which the outer column 13a pivots during a secondary collision. As a result, there is no moment acting on the outer column 13a in the direction that causes pivoting around the tightening rod 27a. It also becomes possible to stabilize the state of the friction fit between the front section of the outer column 13a and the rear section of the inner column 14a, as well as it is possible to stabilize the sliding motion of this section, and thus it is possible to stabilize the absorption state of absorbing impact energy during a secondary collision.

In order to absorb impact energy during a secondary collision, not only is the friction resistance at the area of engagement between the inner circumferential surface of the front section of the outer column 13a and the outer circumferential surface on the rear section of the inner column 14a used, but also the plastic deformation of the energy absorbing member 36a is used, so it becomes easier to stabilize the performance of absorbing impact energy, and tuning of this absorption performance can also be performed arbitrarily. Furthermore, of both end sections in the forward and backward direction of the energy absorbing member 36a, the rear end section is supported by the tightening rod 27a and the front end section is supported by the housing 41. These members 27a, 41 are originally installed in the steering apparatus, and are not new members that must be installed for installing the energy absorbing member 36a. Therefore, it is possible to suppress a rise in cost to install this energy absorbing member 36a.

Figure 9:
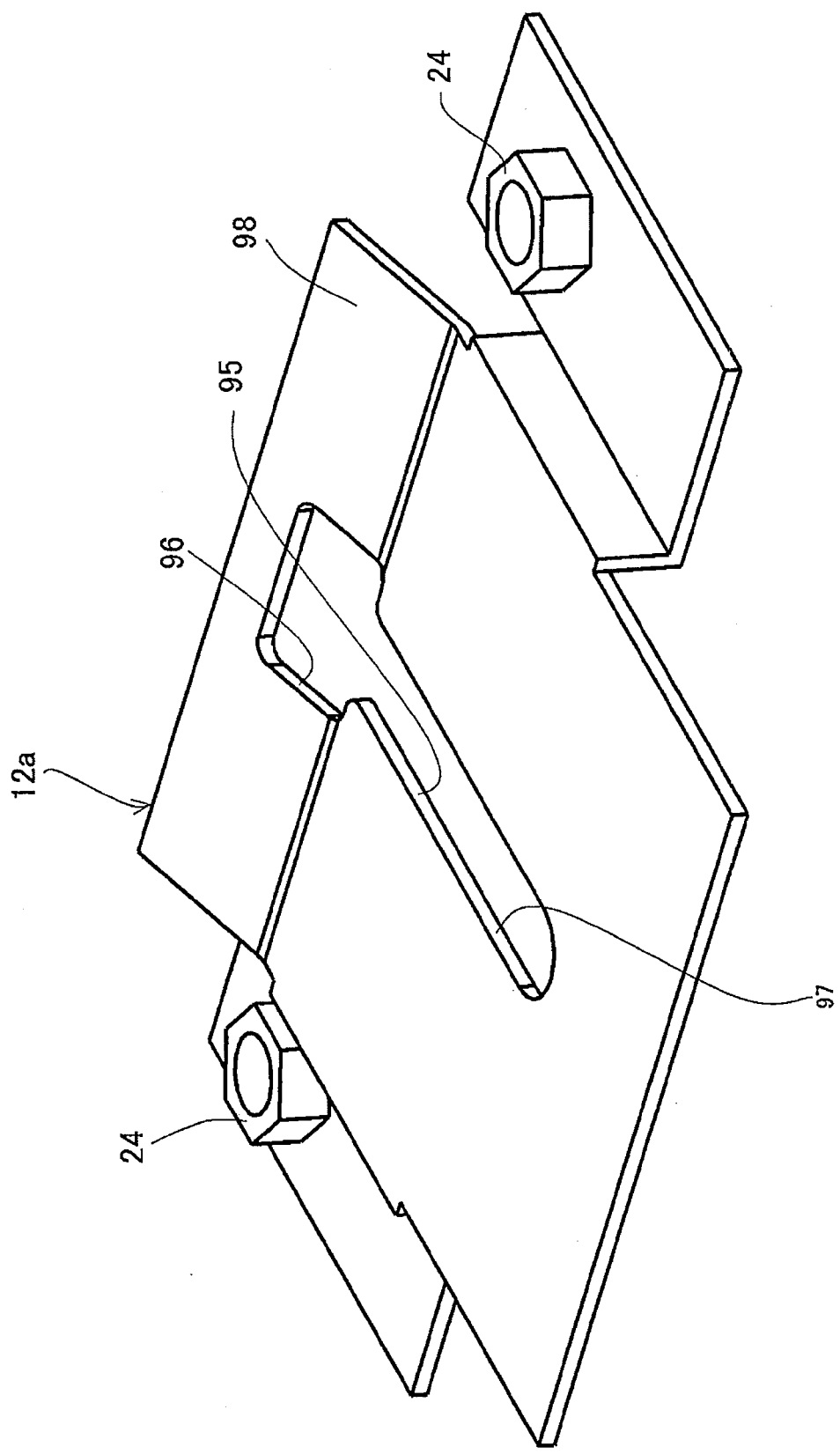
FIG. 9 is a perspective view of a bracket on the vehicle side of the steering apparatus in FIG. 1 as seen from the upper front.
Figure 10:
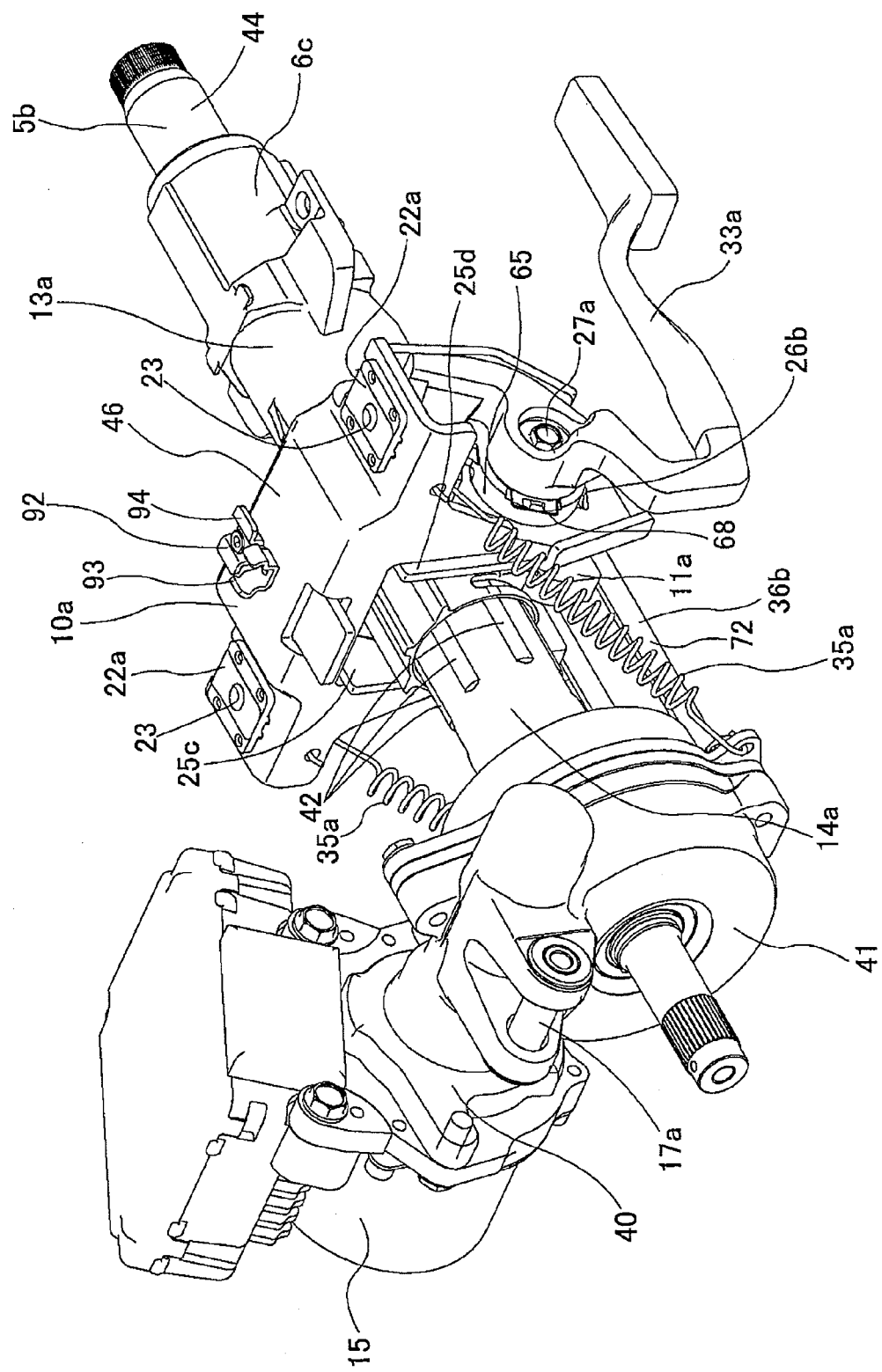
FIG. 10 is a perspective view of the normal state of an example of a steering apparatus of a second embodiment of the present invention as seen from the upper front.

In addition, in the case of the example illustrated in the figures, an installation bracket 92 is fastened to the center section of the top surface of the installation plate section 46 of the support bracket 10a in the portion near the rear end. The front half section of this installation bracket 92 functions as an elastic locking section 93, and the rear half section functions as a guide rim section 94. On the other hand, in order to attach support bracket 10a, a locking hole 97 having a narrow section 95 and a wide section 96, as illustrated in FIG. 9, is formed in the bracket 12a on the vehicle side, which is fastened to the vehicle beforehand. The wide section 96 is formed in a bent section 98 that is formed by bending the rear end section of the bracket 12a on the vehicle side is bent upward. When installing a steering apparatus that includes the steering column 6c in the vehicle, first, the housing 41 is supported by the vehicle body by a bolt that is inserted though a support pipe 17a such that it can pivot. From this state, as the support bracket 10a is displaced upward together with the steering column 6c, the width of the elastic locking section 93 is elastically constricted and locked into the rear end section of the narrow section 95 of the locking hole 97. In this state, the support bracket 10a is temporarily fastened to the bracket 12a on the vehicle side, so the work of screwing and fastening this support bracket 10a to the bracket 12a on the vehicle side can be performed easily.

During a secondary collision, before the capsules 22a come out from the cut out sections 21a, and the support force of this support bracket 10a by these capsules 22a is lost, the guide rim section 94 enters into the narrow section 95 from the wide section 96. The engagement between both side sections of this guide rim section 94 and both side sections of the narrow section 95 of the bracket 12a on the vehicle side prevent the support bracket 10a from dropping down. As a result, as a secondary collision proceeds, it is possible to prevent the steering wheel 1 from dropping excessively, and it is possible to properly maintain the positional relationship between the airbag that spreads out at the rear of the steering wheel 1 and the body of the driver. In the case of a mild collision accident, it is possible to operate the steering wheel even after the accident, and to lessen the work needed for removing the vehicle that was in the accident.

[Embodiment 2]

An example of a second embodiment of the present invention will be explained with reference to FIG. 10 to FIG. 19. In the impact absorbing steering apparatus of this embodiment, only the construction for absorbing impact energy during a secondary collision, or in other words, only the construction of the energy absorbing member differs from that of the first embodiment. Therefore, an explanation of construction that is the same as that of the first embodiment is omitted or simplified, and the explanation below centers on the characteristic part, which is the energy absorbing member. In the explanation of this embodiment as well, the explanation is based on construction in which the tightening rod is located on the lower side of the outer column, however, needless to say, this form can also be applied to construction in which the tightening rod is located on the upper side of the outer column. In this case, as in the explanation of the first embodiment, the positional relationship of the members and between members is reversed in the vertical direction.

The energy absorbing member 36b, which is the characteristic feature of this embodiment, is located between the middle section in the axial direction of the tightening rod 27a, which is the portion that displaces in the forward direction with the outer column 13a during a secondary collision, and the rear end surface of the housing 41 of an electric-powered steering apparatus 40. The energy absorbing member 36b is formed as a single piece as illustrated in FIGS. 16A to 16D and FIGS. 19A and 19B by a punching and bending in a pressing process, and when necessary grinding of metal plate, such as mild steel plate, that has sufficient strength and rigidity for absorbing impact energy, as well as can be plastically deformed.

More specifically, the energy absorbing member 36b is made of a metal plate such as mild steel that can be plastically deformed and cut, and comprises a base plate section 71, a pair of bent plate sections 72, a bent back section 73, a rear end installation section 74, a pair of left and right thin sections 75, and a pair of left and right front end installations sections 76.

The bent plate sections 72 are bent upward (downward in the case where the slit is on the upper side of the outer column 13a) at a right angle from the edges on the left and right sides of the base plate section 71, and are parallel with each other in the forward/backward direction and vertical direction. The bent back section 73 is formed into a U shape by bending the band-shaped section that extends to the rear from the middle section in the width direction of the edges on the rear end of the base plate section 71 upward (or downward) 180 degrees. The rear end installation section 74 comprises a pair of left and right protruding sections 77 that are formed by bending the portions that protrude to the side from the edges on both sides of the tip end section of the bend back section 73 upward (or downward) at right angles. Through holes 78 through which the tightening rod 27a can be inserted are formed in these protruding sections 77 at positions that are aligned with each other. In the definition of the present invention, the through holes 78 correspond to third through holes.

The thin sections 75 are located on the edge of the rear end of the base plate section 71 extending forward from the portion on both the left and right sides of the base end section of the bent back section 73, and correspond to the bottom sections of grooves that are formed by cutting, or by a mashing process using press work. Furthermore, the front end installation sections 76 are located on the front end section of the energy absorbing member 36b by bending the portions on the front end sections of the bent plate sections 72 that protrude toward the front further than the front end edge of the base plate section 71 at right angles toward opposite directions from each other. Installation holes 79 are formed in the center section of the front end installation sections 76.

The energy absorbing member 36b described above is located between the outer column 13a and the housing 41. In order for this, the tightening rod 27a is inserted through the through holes 78 that are formed in the protruding sections 77 of the rear end installation section 74. The rear end section of the energy absorbing member 36b is connected to the outer column 13a by way of the tightening rod 27a, and this energy absorbing member 36b is installed such that during a secondary collision, the rear end installation section 74 that is located on the tip end section of the bent back section 73 of the energy absorbing member 36b will displace in the forward direction together with the outer column 13a. On the other hand, bolts 80 that are inserted through the installation holes 79 in the front end installation sections 76 screw into screw holes that are opened into the surface on the rear end of the housing 41, and by tightening the bolts 80, the front section of the energy absorbing member 36b is connected and fastened to the housing 41. In this way, with the energy absorbing member 36b installed, the top edges of the portion of the bent plate sections 72 near the rear end come in contact with or close to the surface on the bottom end of the held wall sections 11a.

Figure 11:
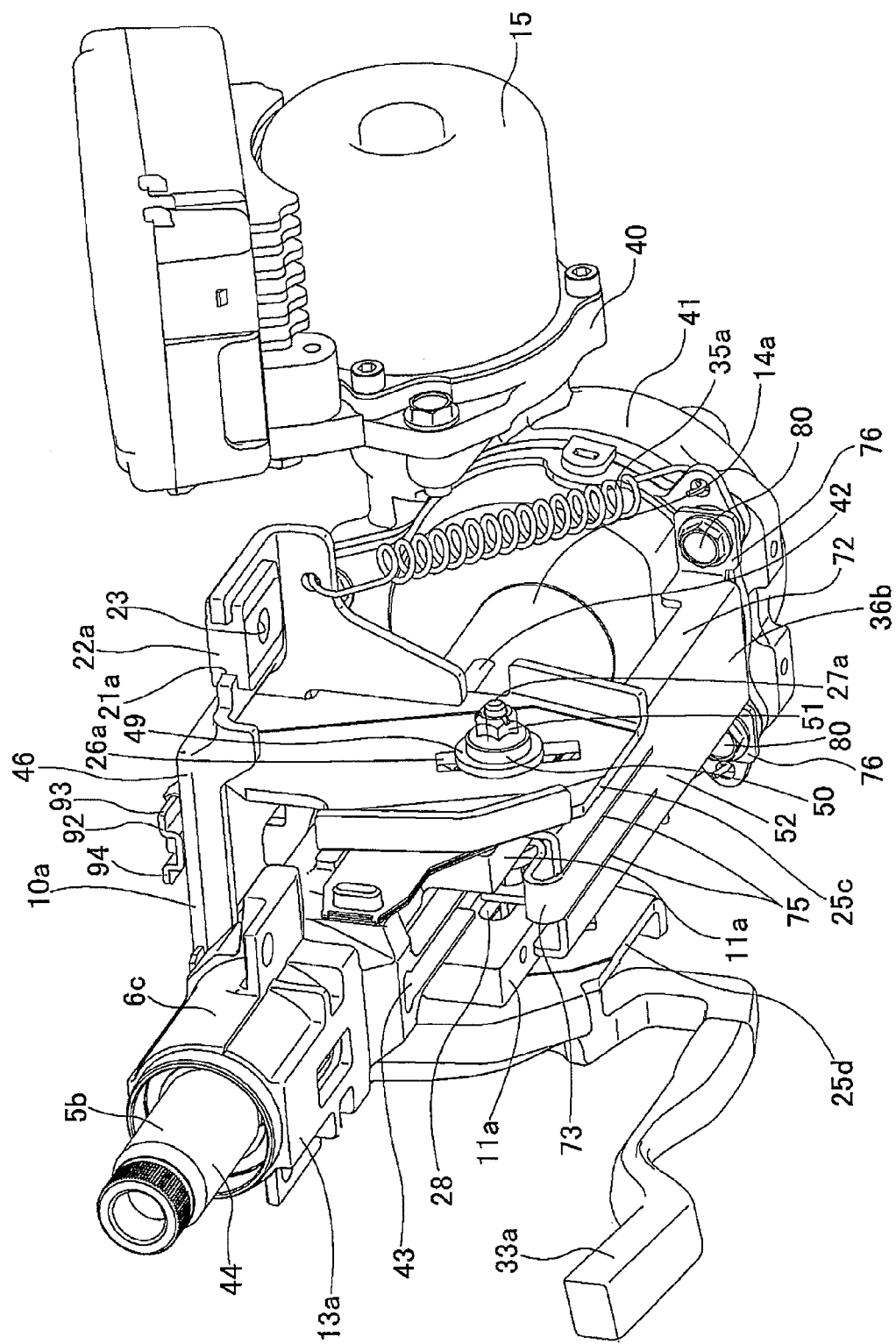
FIG. 11 is a perspective view of the normal state of the steering apparatus in FIG. 10 as seen from the lower rear.
Figure 12:
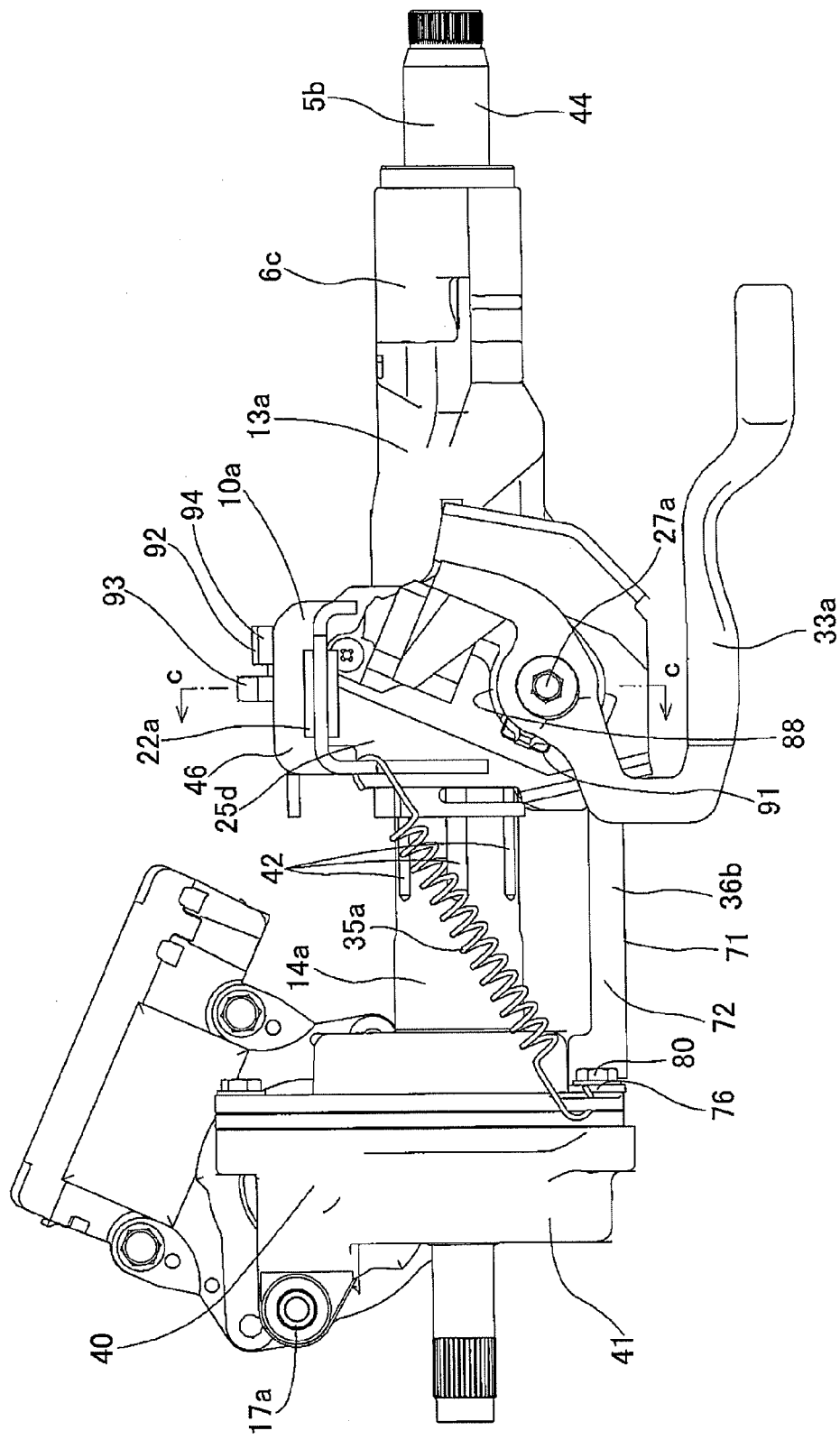
FIG. 12 is a side view of the normal state of the steering apparatus in FIG. 10.
Figure 13:
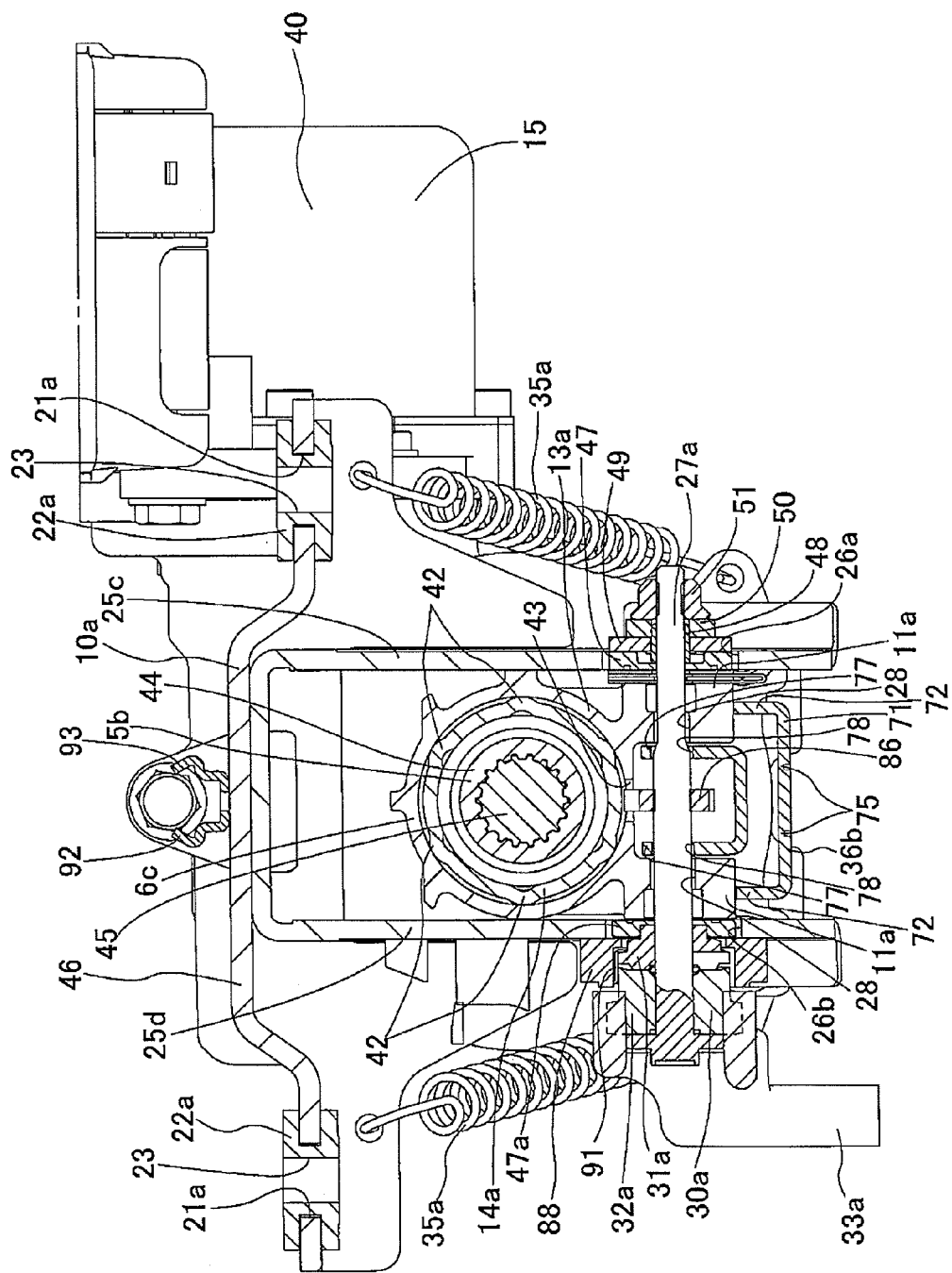
FIG. 13 is a cross-sectional view of section c-c in FIG. 12.
Figure 14:
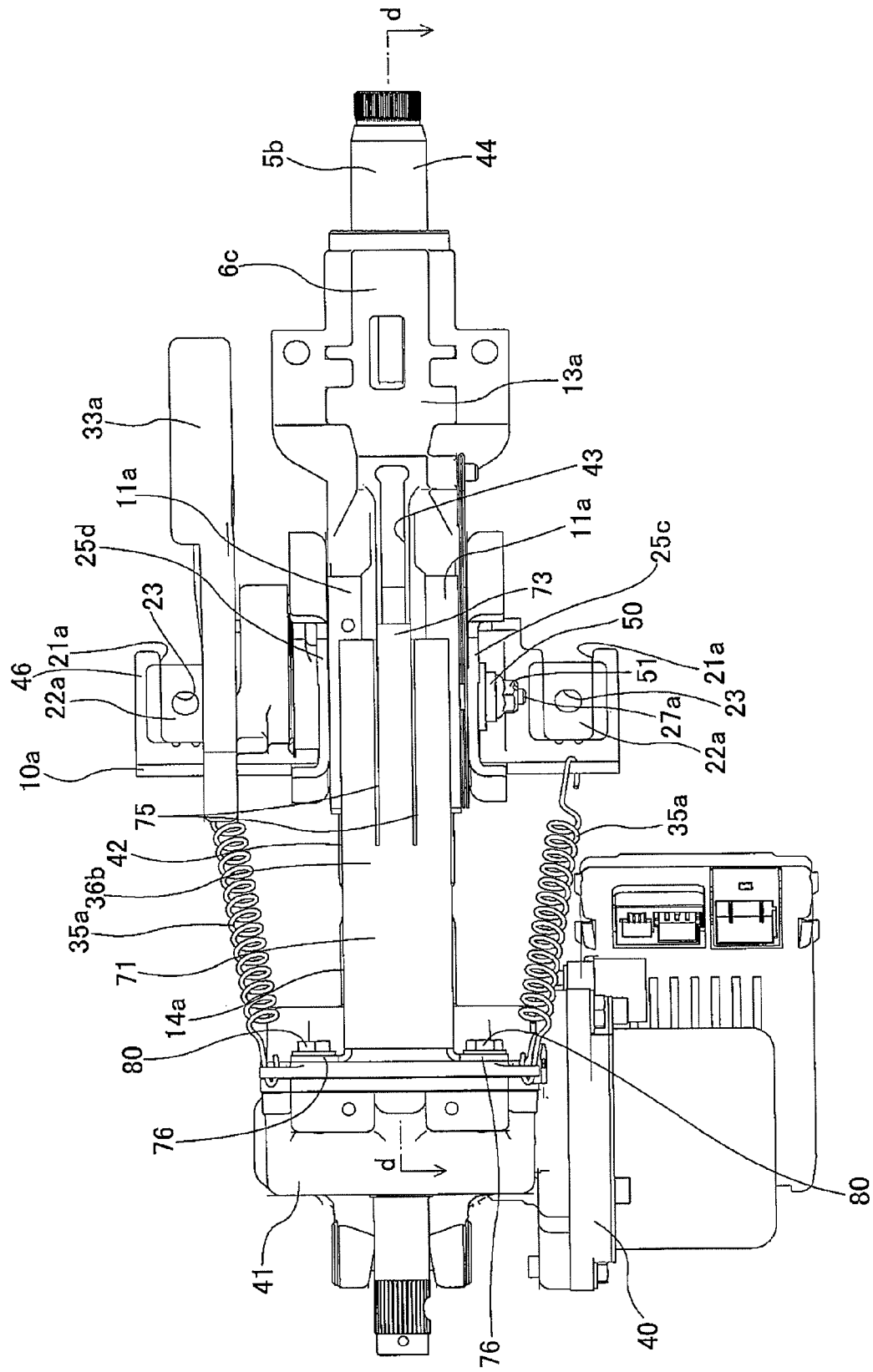
FIG. 14 is an orthographic projection illustrating the normal state of the steering apparatus in FIG. 10 as seen from the bottom.
Figure 15:
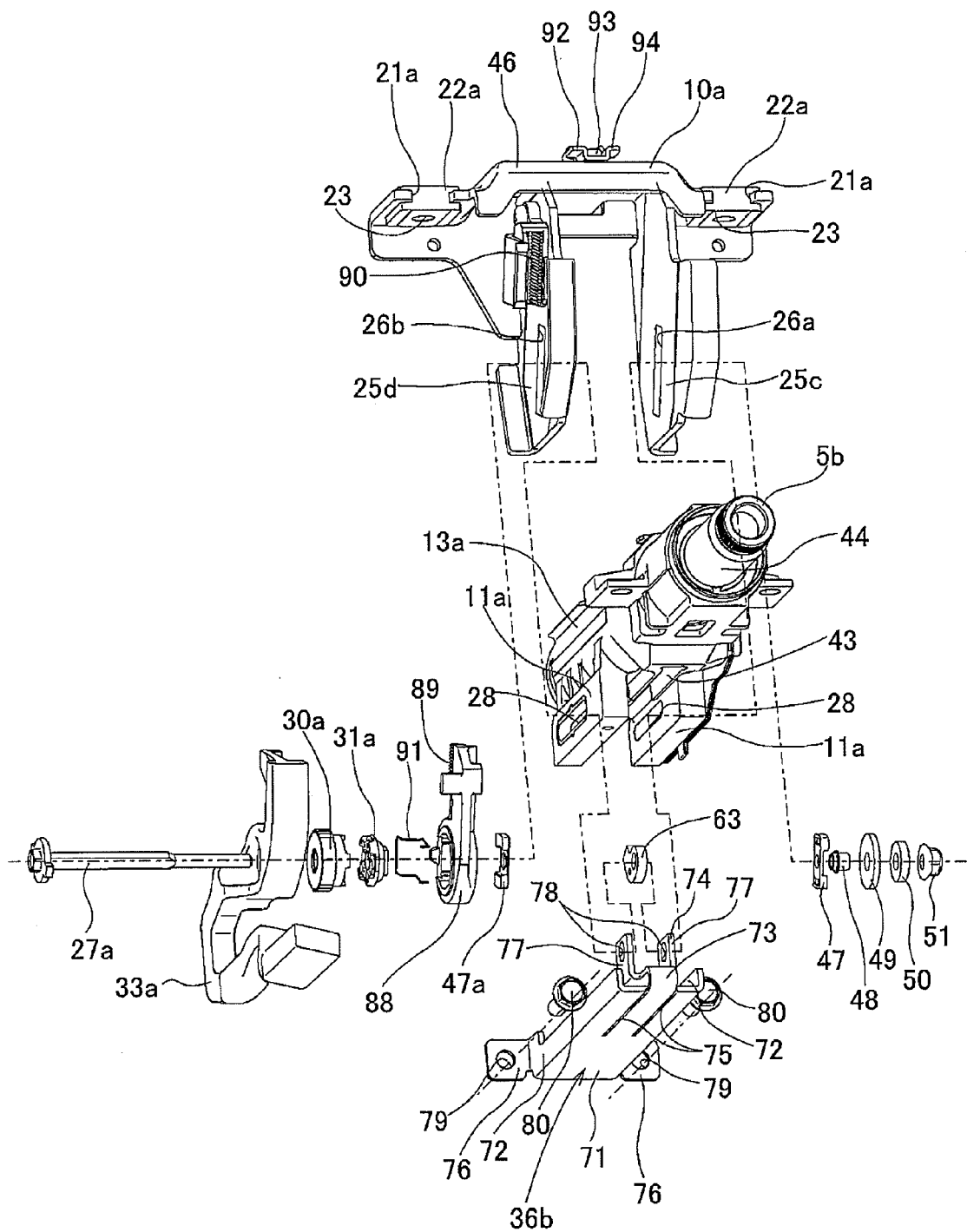
FIG. 15 is an exploded perspective view of the mechanism portion for adjusting the forward/backward position and vertical position of the outer column of the steering apparatus in FIG. 10 and illustrates the state as seen from the lower rear.
Figure 16:
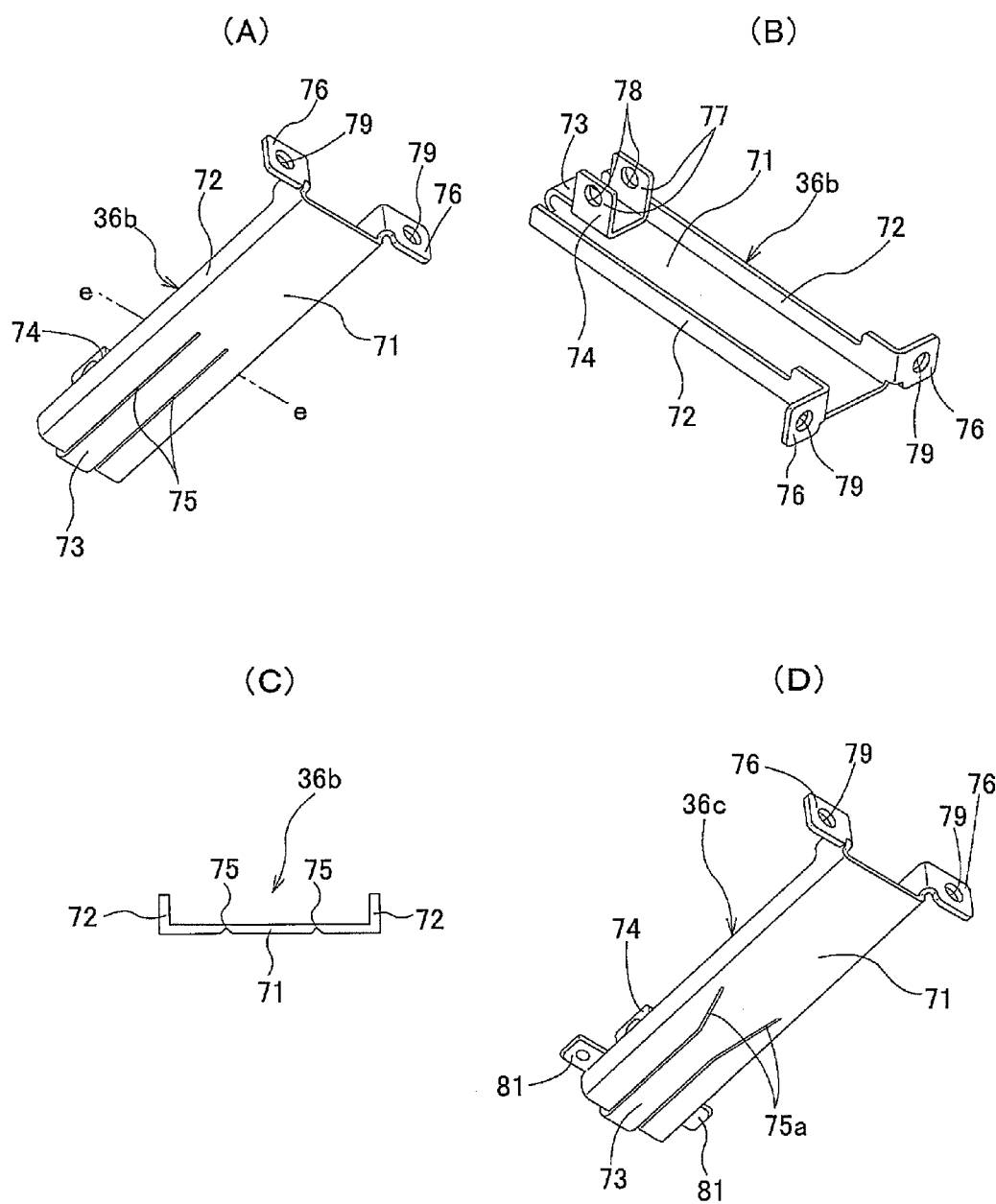
FIGS. 16A to 16D are views of the energy absorbing member of the steering apparatus in FIG. 10, where
Figure 17:
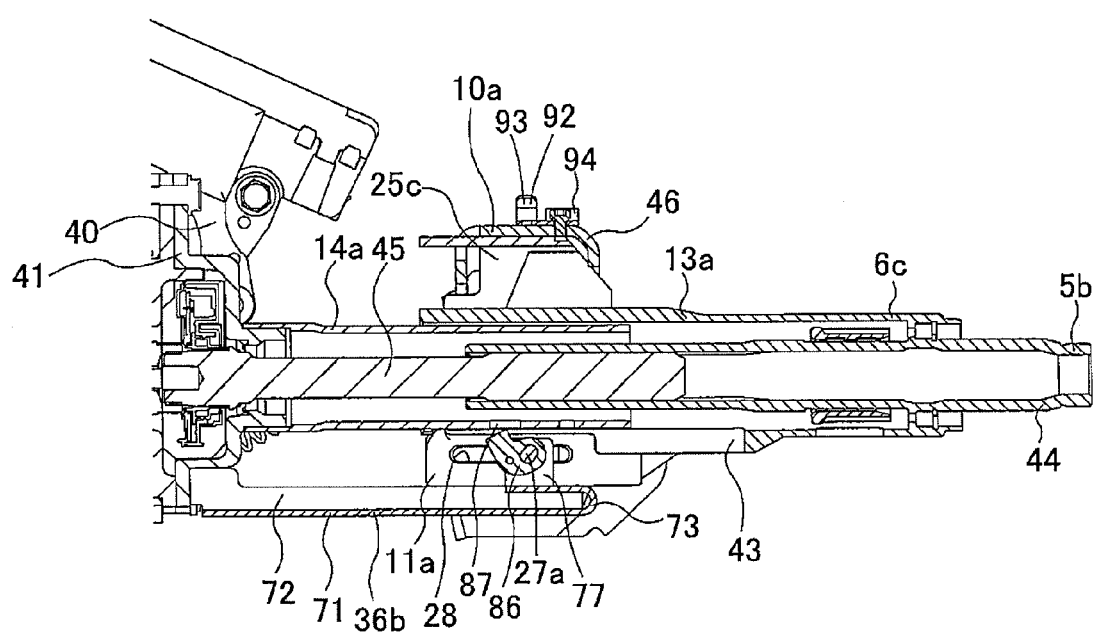
FIGS. 17A and 17B are cross-sectional views of section d-d in FIG. 14 of the steering apparatus in FIG. 10, where
Figure 17:
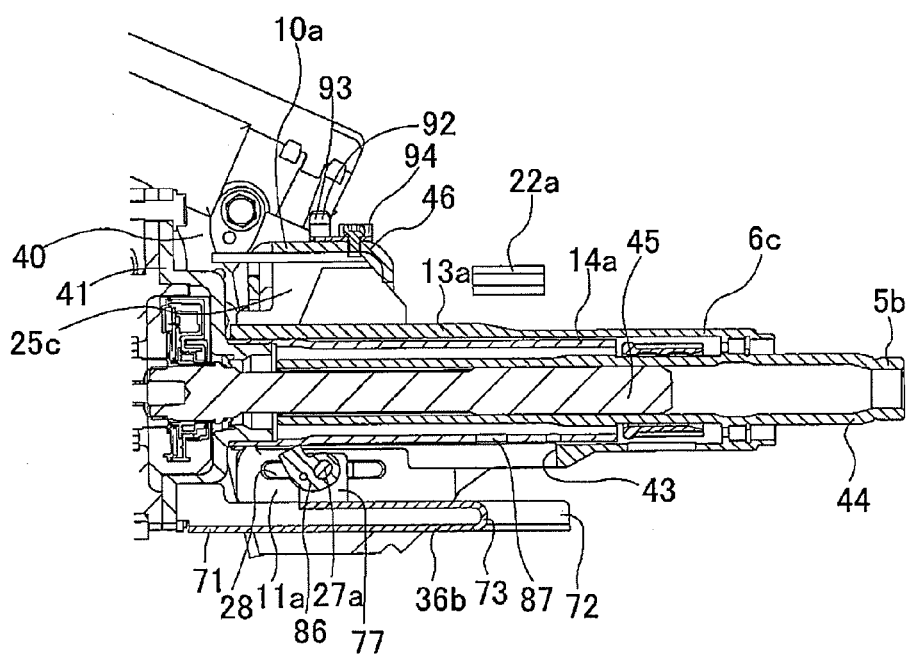

Having the construction described above, the energy absorbing member 36b that is installed between the tightening rod 27a and the housing 41 as described above, is such that during a secondary collision, as the thin sections 75 shear, the bent back section 73 plastically deforms from the state illustrated in FIG. 11, FIG. 14 and FIG. 17A to the state illustrated in FIG. 17B. In other words, when a secondary collision occurs, the outer column 13a first moves to a position at the rear end of the long holes 28 in the forward/ backward direction, or in other words, the very front position in which the forward/backward position of the steering wheel 1 can be adjusted. This movement is opposed to a friction force that acts at the area of contact between the inside surfaces of the holding plate sections 25c, 25d and the outside surfaces of the held wall sections 11a. During this kind of movement, this friction force absorbs to a certain extent the impact energy that is applied to the outer column 13a from the steering wheel 1. However, the friction force is limited, so typically, before the impact energy can be sufficiently absorbed, the tightening rod 27a moves to the rear end of the long holes 28 in the forward/backward direction.

The outer column 13a moves further forward from this state, and during this further movement, the tightening rod 27a moves in the forward direction together with the outer column 13a. As the tightening rod 27a moves forward, the rear end installation section 74 of the energy absorbing member 36b displaces in the forward direction. Then as the thin sections 75 shear, the U-shaped bent back section 73 is caused to move along the original band-shaped portion and the portions that become band-shaped due to the shearing of the thin sections 75. At this time, in order to move the U-shaped bent back section 73, it is necessary to overcome the plastic resistance that resists against the movement of the curved section of the band-shaped portion, and the shear resistance that resists against the shearing of the thin sections 75. Moreover, in order to cause the outer column 13a to displace in the forward direction, in addition to overcoming the friction resistance, it is necessary to overcome the plastic resistance and shear resistance. The values of the plastic resistance and the shear resistance can be adjusted arbitrarily and stably. During the further movement, in addition to the friction resistance, the impact energy is also absorbed by the plastic resistance and shear resistance. Therefore, it is possible to stabilize the capability of absorbing this impact energy and to arbitrarily tune this absorption performance.

Particularly, in the construction of this embodiment, the top edges of the portions near the rear end of the bent plate sections 72 come in contact with or come close to the surface on the bottom end of the held wall sections 11a, so it is possible to stabilize the posture of the energy absorbing member 36b during a secondary collision. In other words, as a secondary collision proceeds, the rear end installation section 74 displaces in the forward direction, and when causing the bent back section 73 to displace in the forward direction as the thin sections 75 shear, the rear end section of the energy absorbing member 36b is pulled upward. Due to this force acting in a pulling up direction, the top edges of the portions near the rear ends of the bent plate sections 7 strongly push against the bottom end surface of the held wall plates 11a, however, when that happens, the posture of the energy absorbing member 36b does not change, or in that case that the posture does change, stops after only a little change. Therefore, it is possible to prevent the plastic resistance and shear resistance from becoming unstable.

The values of the plastic resistance and the shear resistance can be adjusted according to the material and thickness of the metal plate of the energy absorbing member, and the thickness and width of the thin sections, as well as can be adjusted by the planar shape of the thin sections. For example, in the case of the energy absorbing member 36c illustrated in FIG. 7D, by making the front end sections of the thin sections 75a be angled in a direction such that the width of the space between them becomes wider in the forward direction, it is possible to gradually increase the force required for tearing these thin sections 75 as a secondary collision proceeds. As a result, in this energy absorbing member 36c, the capability of absorbing impact energy can be gradually increased in the final stages of a secondary collision, making it easier to protect the driver. Moreover, as illustrated in FIG. 7D, by forming the installation sections 81 on the rear end sections of the bent plate sections 72, and connecting and fastening these installation sections 81 to the held wall sections 11a using screws or the like, it is possible to further stabilize the posture of the energy absorbing member 36 as a secondary collision proceeds.

Figure 18:
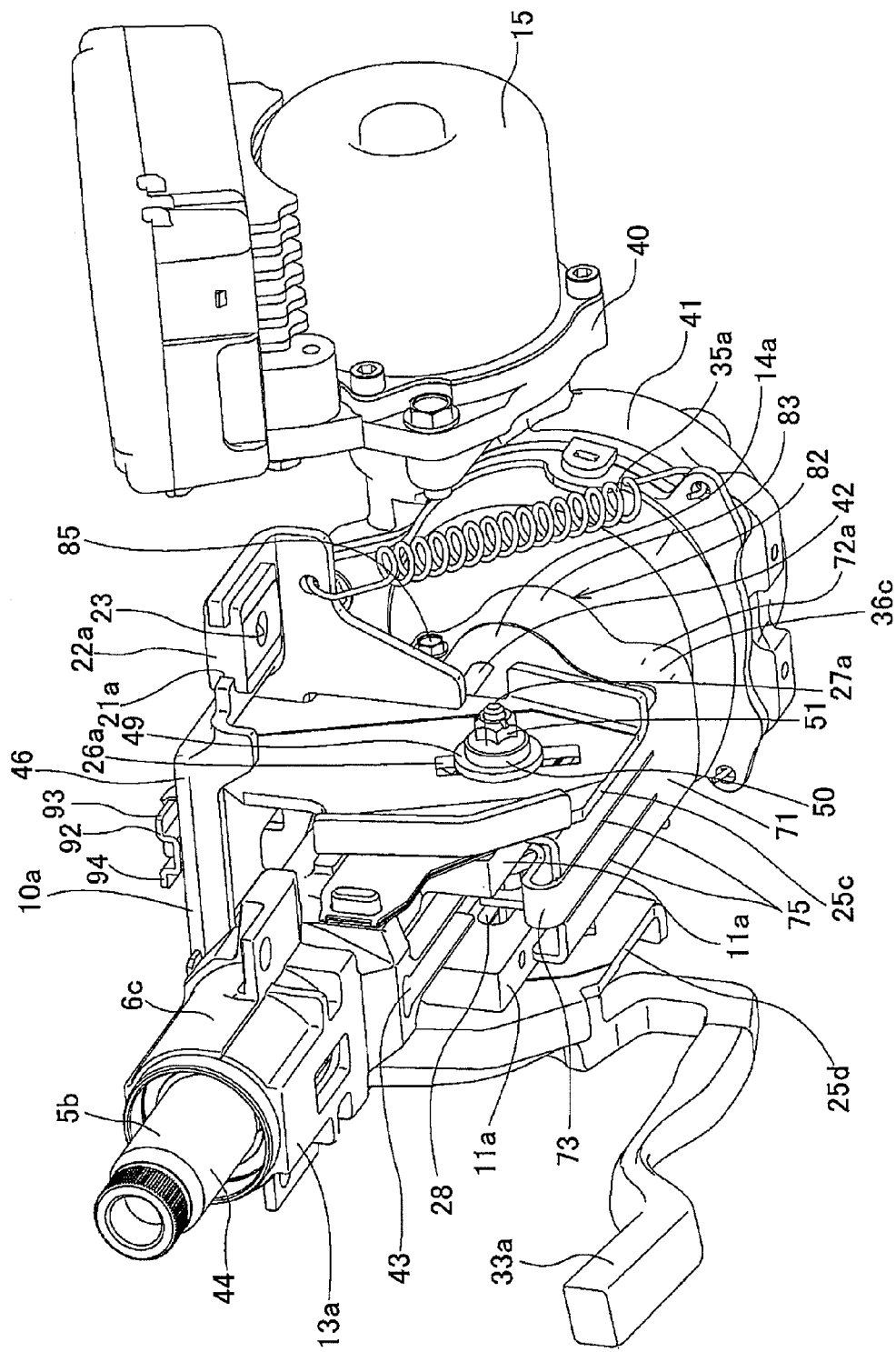
FIG. 18 is a perspective view illustrating the normal state of another example of the steering apparatus of a second embodiment of the present invention as seen from the lower rear.
Figure 19:
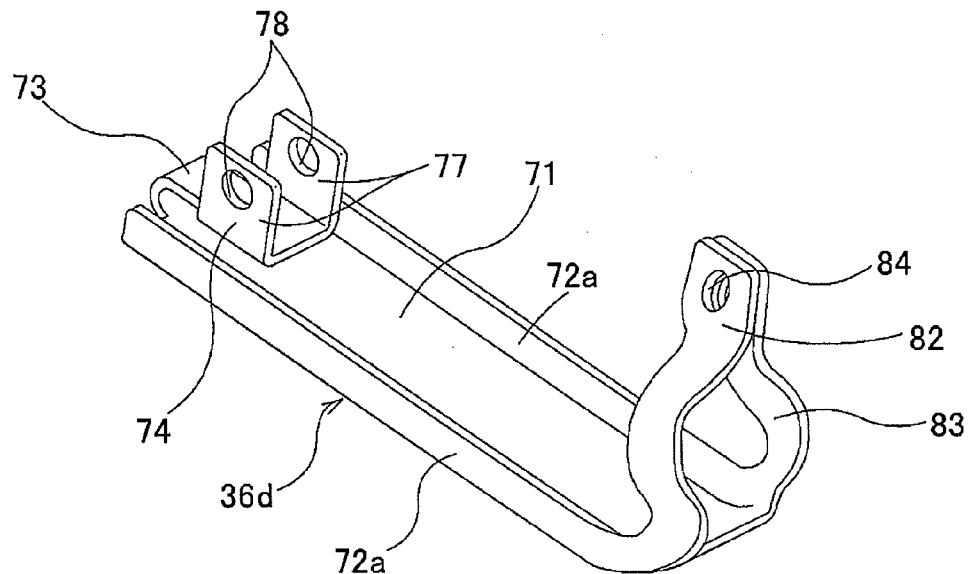
FIGS. 19A and 19B are perspective views of the energy absorbing member of the steering apparatus in FIG. 18, where
Figure 19:
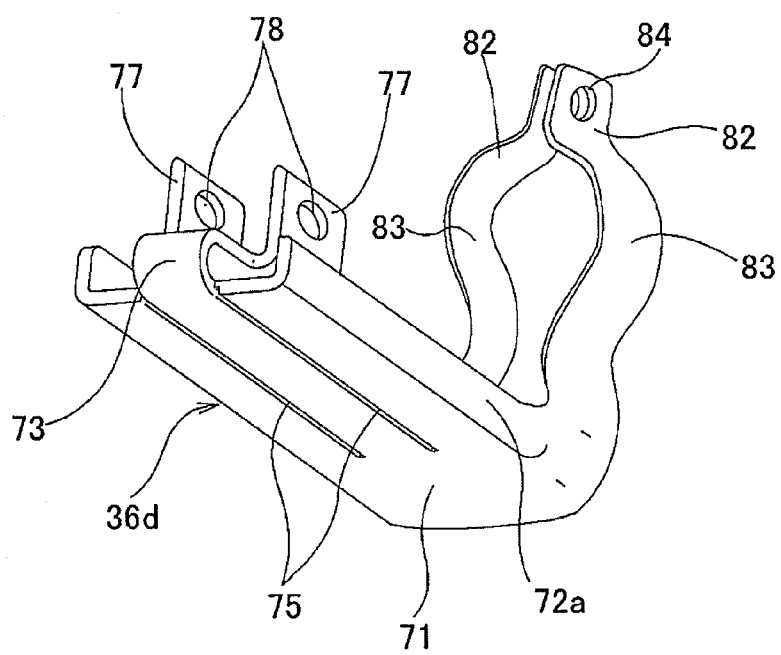

In the present invention, by supporting the front end section of the energy absorbing member 36a, 36b, 36c by the housing 41 for an electric-powered steeling apparatus, this energy absorbing member 36a, 36b, 36c is fastened to the housing 41, which is a rigid body made of die cast aluminum, so even when an impact load is applied, deformation of that installation section is prevented, fluctuation in the absorption of impact energy is suppressed and absorption of impact energy is stabilized. However, the present invention is not limited to such a form. For example, in the second embodiment, as illustrated in FIG. 18 and FIG. 19, the construction of the front end installation section 82 of the energy absorbing member 36d can be such that instead of the housing 41, it is connected and fastened to the outer circumferential surface of the front end section of the inner column 14a, the front end of which is connected and fastened to the housing 41. In this case, front end installation sections 82 are formed by bending the edges on both the left and right sides of the front end section of the base plate section 71 at right angles in the same direction from the base plate section 71 at the same time that the bent plate sections 72a are formed so that the sides extend upward (downward in the case of construction in which the slit 43 is on the upper side of the outer column 13a) from the front end section of the bent plate sections 72a, a curved section 83 that is curved along the shape of the outer circumferential surface of the front end section of the inner column 14a being provided in between, and installation holes 84 being formed in the tip end sections of the front end installation sections 82 such that the front end installation sections 84 can be connected and fastened to the inner column 14a by inserting a bolt 85 through the installation holes 84, screwing that bolt 85 into a nut (not illustrated in the figure) and tightening. The curved section 83 can also be constructed by using typically used tightening bands.

In this second embodiment, the portion that, together with the bent back section 73 is between the pair of left and right thin section 75, 75a that extend to the middle section of the base plate section 71 corresponds to the energy absorbing section in the definition of the present invention. Moreover, the guide section in the definition of the present invention is formed by the thin sections 75, 75a and the portion on both sides of the thin sections 75, 75a of the base plate section 71, and the bent plate sections 72. With this construction, movement of the bent back section 73 is guided by this guide section, and proceeds smoothly, so fluctuation in the absorption performance of absorbing impact energy is suppressed. This guide section also functions as a cover, so when there is deformation of the electronic parts harness or column cover near the energy absorbing member 36b, 36c during a collision, it becomes difficult for interference due to that deformation to be received, so absorption of the impact energy can be performed stably.

In an impact absorbing steering apparatus of this second embodiment having this kind of construction, it is possible to obtain the same effect as the apparatus of the first embodiment. The present invention is not limited by the detailed construction of the particular examples of the forms given above.

Industrial Application

The present invention can be suitably applied to a steering apparatus having construction comprising both a telescoping mechanism and a tilting mechanism. However, the invention can also be applied to a steering apparatus having only one or neither of these mechanisms. For example, when applying the present invention to construction that comprises only a telescoping mechanism, from the embodiments illustrated in the figures, the second through holes that are formed in the holding plate sections 25c, 25d, instead of being long holes 26a, 26b in the vertical direction, can be simple circular holes through which the tightening rod 27a can be inserted. On the other hand, in the case of applying the invention to construction having only a tilting mechanism, from the embodiments illustrated in the figures, the first through holes that are formed in the pair of held wall sections 11a, instead of being long holes in the forward/backward direction, can be simple circular holes though which the tightening rod 27a can be inserted. Furthermore, in the case of applying the present invention to construction not having a steering wheel position adjustment device, both the first through holes and second through holes can be simple circular holes. In the case of construction not having this kind of position adjustment device, the tightening rod can be a bolt, and the pair of pressure sections can be formed by the head of the bolt and the nut that the bolt screws into. In this case, the nut functions as one pressure section, as well as functions as a fastening means. In this way, the present invention can be widely applied to an impact absorbing steering apparatus.

Explanation of Reference Numbers

1 Steering wheel
2 Steering gear unit
3 Input shaft
4 Tie rod
5, 5a, 5b Steering shaft
6, 6a, 6b, 6c Steering column
7 Universal joint
8 Intermediate shaft
9 Universal joint
10, 10a Support bracket
11, 11a Held wall section
12, 12a Bracket on the vehicle side
13, 13a Outer column
14, 14a Inner column
15 Electric motor
16 Housing
17, 17a Support pipe
18 Top plate
19a, 19b Side plate
20 Connection plate section
21, 21a Cutout section
22, 22a Capsule
23 Through hole
24 Nut
25a, 25b, 25c, 25d Holding plate section
26, 26a, 26b Long hole in the vertical direction
27, 27a Tightening rod
28 Long hole in the forward/backward direction
29 Rim section
30, 31a Drive cam
31, 31a Driven cam
32, 32a Cam device
33, 33a Adjustment lever
34 Locking section
35, 35a Equalizer spring
36, 36a, 36b Energy absorbing member
37 Vehicle body
38 Support pin
39 Support casing
40 Electric-power steering apparatus
41 Housing
42 Rib
43 Slit
44 Outer shaft
45 Inner shaft
46 Installation plate section
47, 47a Tilt spacer
48 Spacer
49 Washer
50 Thrust bearing
51 Nut
52 Support beam section
53 Energy absorbing section
54 Front end installation section
55 Base plate section
56 Bent up plate section
57 Bent back section
58 Protrusion
59 Through hole
60 Bent up plate section
61 Installation hole
62 Stiffening bead
63 Guide plate
64 Installation plate section
65 Hanging down plate section
66 Guide plate section
67 Contact plate section
68 Screw
69 Guide space
70 Bolt
71 Base plate section
72 Bent plate section
73 Bent back section
74 Rear end installation section
75, 75a Thin section
76 Front end installation section
77 Protruding section
78 Through hole
79 Installation hole
80 Bolt
81 Installation section
82 Front end installation section
83 Curved section
84 Installation hole
85 Bolt
86 Cam member
87 Locking hole
88 Pivot arm
89 Male side gear
90 Female side gear
91 Restoration spring
92 Installation bracket
93 Elastic locking member
94 Guide rim section
95 Narrow section
96 Wide section
97 Locking hole
98 Bent section

The invention claimed is:

1. An impact absorbing steering apparatus, comprising:
a steering column that comprises: an inner column that is located on the front side in a state in which the forward and backward position is regulated; and an outer column that fits around the rear section of the inner column such that relative displacement is possible in the axial direction, and that has a slit in the axial direction that is provided in the axial direction in a front section that fits with the inner column and enables the diameter of the front section to expand or constrict, a pair of held wall sections that are provided on the top surface or the bottom surface of the front section on both the left and right sides of the axial slit, and a pair of first through holes that are formed in these held wall sections at positions that are aligned with each other;
a steering shaft supported on the inner diameter side of the steering column that comprises; an inner shaft; and an outer shaft that fits around the rear section of the inner shaft such that relative displacement in the axial direction is possible, and the rear end section of the outer shaft protruding further toward the rear than an opening on the rear end of the outer column, a steering wheel being supported by and fastened to that rear end section;
a support bracket that comprises: a pair of left and right holding plate sections; a pair of second through holes that formed in these holding plate sections in positions that are aligned with at least part of the first through holes; and an installation plate section that is supported by the vehicle body and that together with supporting the holding plate sections, is capable of dropping toward the front due to impact energy that is applied from the steering wheel to the outer column during a secondary collision;
a tightening rod inserted through the first through holes and second through holes, the tightening rod comprising a pair of pressure sections on both end sections, the tightening rod displacing in the forward direction together with the outer column during the secondary collision;
a fastening unit that increases or decreases the space between the pair of pressure sections, and when that space is decreased, decreases the diameter of the front section of the outer column and creates a friction fit between the inner circumferential surface of the front section of the outer column and the outer circumferential surface of the rear section of the inner column; and
and energy absorbing member that is located between a portion that displaces in the forward direction together with the outer column during the secondary collision and a portion that does not displace in the forward direction during the secondary collision, the energy absorbing member being made of a member that plastically deforms as the outer column displaces in the forward direction during the secondary collision, and absorbs part of the impact energy through the relative movement during the plastic deformation; wherein
the energy absorbing member comprises: a base plate section; an energy absorbing section that is located in the rear half section of the base plate section, or extends to the rear side from the base plate section, and has a U-shaped bent back section that bends back upward or downward with respect to the base plate section; a rear end installation section that is provided on the tip end section of the bent back section and comprises a pair of protruding sections that are provided on the tip end section of the bent back section, and third through holes that are formed in the protruding section; and a front installation section that is provided in front of the base plate section;
the tip end section of the bent back section and the rear end installation section are located in a space between the pair of held wall sections, and fastened to the tightening rod with the tightening rod being inserted through the third through holes; and
the front end installation section is fastened to the portion that does not displace in the forward direction during the secondary collision.

2. The impact absorbing steering apparatus according to claim 1, comprising
a guide section that, when the bent back section moves as the rear end installation section moves in the forward direction together with outer column during the secondary collision, guides the movement of the bent back section.

3. The impact absorbing steering apparatus according to claim 1, wherein the portion to which the front end installation section is fastened and that does not displace in the forward direction is the front end section of the inner column or a member that is fastened to the front end section of the inner column.

4. The impact absorbing steering apparatus according to claim 3, wherein
the portion to which the front end installation section is fastened and that does not displace in the forward direction is a housing that is fastened to the front end section of the inner column and that stores component parts of an electric-powered steering apparatus;
the front end installation section comprises contact plate sections that are bent at right angles in directions opposite of each other from the front end edge of the base section or a portion that protrudes in the forward direction from the front end edge of the base section; and
with these contact plate sections in contact with the rear end surface of the housing, the front end installation section is connected and fastened to the housing.

5. The impact absorbing steering apparatus according to claim 3, wherein
the portion to which the front end installation section is fastened and that does not displace in the forward direction is the front end section of the inner column;
the front end installation section comprises members that extend in the same direction upward or downward from the edges on both the left and right sides of the front end section of the base section, or from the portion that protrudes in the forward direction from the front end section of the base section, with each of these members comprising a curved section that curves along the shape of the outer circumferential surface of the inner column, and a tip end section in which an installation hole is formed; and with the curved section fitted around the front end section of the inner column, by inserting a bolt through the installation holes, then screwing the bolt into a nut and tightening the bolt, these tip end sections are connected and fastened.

6. The impact absorbing steering apparatus according to claim 1, wherein
the energy absorbing section extends toward the rear from the base plate section and the bent back section is provided in the middle section thereof.

7. The impact absorbing steering apparatus according to claim 6 further comprising a guide plate having a crank shaped cross section, the guide plate comprising: an installation plate section; a hanging down plate section that is bent at a right angle from the installation plate section; and a guide plate section that is bent at a right angle from the hanging down plate section toward the opposite side from the installation plate section, wherein the installation plate is fastened in a state of contact with the bottom surface of one of the held wall sections;

the guide plate section faces a space between the pair of held wall sections, and forms a guide space between the guide plate section and the top surface or bottom surface of the front section of the outer column;

the energy absorbing section of the energy absorbing member is located in the guide space, and when the bent back section of the energy absorbing section moves as the rear end installation section moves in the forward direction together with the outer column during a secondary collision, the guide plate guides the movement of the bent back section.

8. The impact absorbing steering apparatus according to claim 1, wherein the bent back section extends to the rear from the middle section in the width direction of the rear end edge of the base plate section;

the base plate section comprises a pair of left and right thin sections that extend from the portion of the rear end edge of the base plate section that is between both the left and right sides of the base end section of the bent back section to the middle section of the base plate section; and the portion of the base plate section that is between the pair of left and right thin section forms part of the energy absorbing section.

9. The impact absorbing steering apparatus according to claim 1 wherein the energy absorbing member further comprises a pair of bent plate sections that are bent in the same direction from both the left and right sides of the base plate section, wherein at least the portions near the rear end edges of bottom end edges of the bent plate sections come in contact with or close to the bottom surface or top surface of the held wall sections.

10. The impact absorbing steering apparatus according to claim 1, wherein the first through holes are constructed as long holes in the forward/backward direction that are long in the axial direction of the outer column, the forward/backward position of the outer column can be adjusted within the range that the tightening rod can displace inside these first through holes, and by operating the adjustment lever that is located on the base end section of the tightening rod, the space between the pair of pressure sections is expanded or contracted, such that when the space is contracted, the diameter of the front section of the outer column is decreased, and fastens the forward/backward position of the outer column.

11. The impact absorbing steering apparatus according to claim 1, wherein the front end section of the inner column is supported by the vehicle body such that pivoting around a horizontal axis is possible;

the second through holes are long holes in the vertical direction that are long in the vertical direction and have a partial arc shape around the horizontal axis as a center;

the vertical position of the steering wheel can be adjusted within the range that the tightening rod can displace inside the long holes in the vertical direction, by operating an adjustment lever that is located at the base end section of the tightening rod, the space between the pair of pressure sections is expanded or contracted, such that when the space is contracted, the space between the pair of holding plate sections is decreased, causing a friction fit between the inside surface of these holding plate sections and the outside surface of the held wall sections, and the vertical position of the outer column is fastened.

12. The impact absorbing steering apparatus according to claim 1, wherein a plurality of ribs that are long in the axial direction are formed around the outer circumferential surface of the inner column such that the outer circumferential surface of the inner column and the inner circumferential surface of the outer column come in contact at the apex sections of these ribs.

13. The impact absorbing steering apparatus according to claim 1, wherein by forming a spline fit between male spline teeth that are formed around the outer circumferential surface on the end section of the inner shaft and female spline teeth that are formed around the inner circumferential surface on the end section of the outer shaft, extension and contraction is possible along the entire length of the spline shaft; and a coating layer of synthetic resin having a low friction coefficient is formed on the surface of at least one of the male spline teeth and female spline teeth.

14. The impact absorbing steering apparatus according to claim 1, wherein a cam member fits around the middle section of the tightening rod, and when the tightening rod has been rotated in a direction that increases the diameter of the front section of the outer column, the cam member passes through the axial slit that is formed in the front section of the outer column and enters inside the locking hole that is formed in the rear section of the inner column.

15. An impact absorbing steering apparatus, comprising:

a steering column that comprises: an inner column that is located on the front side in a state in which the forward and backward position is regulated; and an outer column that fits around the rear section of the inner column such that relative displacement is possible in the axial direction, and that has a slit in the axial direction that is provided in the axial direction in a front section that fits with the inner column and enables the diameter of the front section to expand or constrict, a pair of held wall sections that are provided on the top surface or the bottom surface of the front section on both the left and right sides of the axial slit, and a pair of first through holes that are formed in these held wall sections at positions that are aligned with each other;

a steering shaft supported on the inner diameter side of the steering column that comprises; an inner shaft; and an outer shaft that fits around the rear section of the inner shaft such that relative displacement in the axial direction is possible, and the rear end section of the outer shaft protruding further toward the rear than an opening on the rear end of the outer column, a steering wheel being supported by and fastened to that rear end section;

a support bracket that comprises: a pair of left and right holding plate sections; a pair of second through holes that formed in these holding plate sections in positions that are aligned with at least part of the first through holes; and an installation plate section that is supported by the vehicle body and that together with supporting the holding plate sections, is capable of dropping toward the front due to impact energy that is applied from the steering wheel to the outer column during a secondary collision;
a tightening rod that is inserted through the first through holes and second through holes, and that comprises a pair of pressure sections on both end sections;
a fastening unit that increases or decreases the space between the pair of pressure sections, and when that space is decreased, decreases the diameter of the front section of the outer column and creates a friction fit between the inner circumferential surface of the front section of the outer column and the outer circumferential surface of the rear section of the inner column; and
and energy absorbing member that is located between a portion that displaces in the forward direction together with the outer column during the secondary collision and a portion that does not displace in the forward direction during that secondary collision, the energy absorbing member being made of a member that plastically deforms as the outer column displaces in the forward direction during the secondary collision, and absorbs part of the impact energy through the relative movement during the plastic deformation; wherein
the energy absorbing member comprises: a base plate section; an energy absorbing section that is located in the rear half section of the base plate section, or extends to the rear side from the base plate section, and has a U-shaped bent back section that bends back upward or downward with respect to the base plate section; a rear end installation section that is provided on the tip end section of the bent back section; and a front installation section that is provided in front of the base plate section;
the tip end section of the bent back section and the rear end installation section are located in a space between the pair of held wall sections, and fastened to the portion that displaces in the forward direction together with the outer column during a secondary collision; and
the front end installation section is fastened to the portion that does not displace in the forward direction during a secondary collision;
wherein the portion to which the front end installation section is fastened and that does not displace in the forward direction is the front end section of the inner column or a member that is fastened to the front end section of the inner column;
wherein
the portion to which the front end installation section is fastened and that does not displace in the forward direction is a housing that is fastened to the front end section of the inner column and that stores component parts of an electric-powered steering apparatus;
the front end installation section comprises contact plate sections that are bent at right angles in directions opposite of each other from the front end edge of the base section or a portion that protrudes in the forward direction from the front end edge of the base section; and
with these contact plate sections in contact with the rear end surface of the housing, the front end installation section is connected and fastened to the housing.

16. An impact absorbing steering apparatus, comprising:
a steering column that comprises: an inner column that is located on the front side in a state in which the forward and backward position is regulated; and an outer column that fits around the rear section of the inner column such that relative displacement is possible in the axial direction, and that has a slit in the axial direction that is provided in the axial direction in a front section that fits with the inner column and enables the diameter of the front section to expand or constrict, a pair of held wall sections that are provided on the top surface or the bottom surface of the front section on both the left and right sides of the axial slit, and a pair of first through holes that are formed in these held wall sections at positions that are aligned with each other;
a steering shaft supported on the inner diameter side of the steering column that comprises; an inner shaft; and an outer shaft that fits around the rear section of the inner shaft such that relative displacement in the axial direction is possible, and the rear end section of the outer shaft protruding further toward the rear than an opening on the rear end of the outer column, a steering wheel being supported by and fastened to that rear end section;
a support bracket that comprises: a pair of left and right holding plate sections; a pair of second through holes that formed in these holding plate sections in positions that are aligned with at least part of the first through holes; and an installation plate section that is supported by the vehicle body and that together with supporting the holding plate sections, is capable of dropping toward the front due to impact energy that is applied from the steering wheel to the outer column during a secondary collision;
a tightening rod that is inserted through the first through holes and second through holes, and that comprises a pair of pressure sections on both end sections;
a fastening unit that increases or decreases the space between the pair of pressure sections, and when that space is decreased, decreases the diameter of the front section of the outer column and creates a friction fit between the inner circumferential surface of the front section of the outer column and the outer circumferential surface of the rear section of the inner column; and
and energy absorbing member that is located between a portion that displaces in the forward direction together with the outer column during the secondary collision and a portion that does not displace in the forward direction during that secondary collision, the energy absorbing member being made of a member that plastically deforms as the outer column displaces in the forward direction during the secondary collision, and absorbs part of the impact energy through the relative movement during the plastic deformation; wherein
the energy absorbing member comprises: a base plate section; an energy absorbing section that is located in the rear half section of the base plate section, or extends to the rear side from the base plate section, and has a U-shaped bent back section that bends back upward or downward with respect to the base plate section; a rear end installation section that is provided on the tip end section of the bent back section; and a front installation section that is provided in front of the base plate section;
the tip end section of the bent back section and the rear end installation section are located in a space between the pair of held wall sections, and fastened to the portion that displaces in the forward direction together with the outer column during a secondary collision; and
the front end installation section is fastened to the portion that does not displace in the forward direction during a secondary collision;
wherein the portion to which the rear end installation section is fastened and that displaces in the forward direction together with the outer column is the tightening rod;

wherein
the energy absorbing section comprises a bent back section in the middle section thereof that extends toward the rear from the base plate section;
the rear end installation section comprises a pair of protruding sections that are provided on the tip end section of the bent back section, and third though holes that are formed in these protruding sections, with the tightening rod being inserted through the third through holes.

17. The impact absorbing steering apparatus according to claim 16 further comprising a guide plate having a crank shaped cross section, the guide plate comprising: an installation plate section; a hanging down plate section that is bent at a right angle from the installation plate section; and a guide plate section that is bent at a right angle from the hanging down plate section toward the opposite side from the installation plate section, wherein
the installation plate is fastened in a state of contact with the bottom surface of one of the held wall sections;
the guide plate section faces a space between the pair of held wall sections, and forms a guide space between the guide plate section and the top surface or bottom surface of the front section of the outer column;
the energy absorbing section of the energy absorbing member is located in the guide space, and when the bent back section of the energy absorbing section moves as the rear end installation section moves in the forward direction together with the outer column during a secondary collision, the guide plate guides the movement of the bent back section.

* * * * *